(12) United States Patent
Tomich

(10) Patent No.: US 10,597,850 B2
(45) Date of Patent: Mar. 24, 2020

(54) VIBRATING SUBSOIL TOOL

(71) Applicant: Agsoilworks Technology Company, LLC, Paso Robles, CA (US)

(72) Inventor: Randal Tomich, Adelaide (AU)

(*) Notice: Subject to any disclaimer, the term of this patent is extended or adjusted under 35 U.S.C. 154(b) by 0 days.

(21) Appl. No.: 16/273,978

(22) Filed: Feb. 12, 2019

(65) Prior Publication Data

US 2019/0249393 A1   Aug. 15, 2019

Related U.S. Application Data

(63) Continuation-in-part of application No. 15/893,486, filed on Feb. 9, 2018.

(60) Provisional application No. 62/629,716, filed on Feb. 13, 2018.

(51) Int. Cl.
| | | |
|---|---|---|
| A01B 63/11 | (2006.01) |
| A01B 79/00 | (2006.01) |
| E02F 5/32  | (2006.01) |
| A01B 13/08 | (2006.01) |
| E02F 9/28  | (2006.01) |

(52) U.S. Cl.
CPC ............ E02F 5/326 (2013.01); A01B 13/08 (2013.01); E02F 9/2833 (2013.01)

(58) Field of Classification Search
CPC ..... A01B 13/08; A01B 63/111; A01B 79/005; E02F 5/323; E02F 5/326; E02F 9/2816
See application file for complete search history.

(56) References Cited

U.S. PATENT DOCUMENTS

| | | |
|---|---|---|
| 184,171 A | 11/1876 | Porter |
| 774,324 A | 11/1904 | Hill |
| 2,569,556 A | 10/1951 | Collins et al. |
| 3,171,500 A | 3/1965 | Dils |
| 3,704,753 A | 12/1972 | Hasforth et al. |
| 4,102,407 A | 7/1978 | Danszky et al. |
| 4,538,689 A | 3/1985 | Dietrich |
| 4,828,041 A | 5/1989 | Cosson |
| 5,437,337 A | 8/1995 | Dietrich |
| 5,499,686 A | 3/1996 | Parker |

(Continued)

FOREIGN PATENT DOCUMENTS

| | | |
|---|---|---|
| AU | 420938 B | 7/1968 |
| DE | 2647812 A | 4/1978 |

(Continued)

OTHER PUBLICATIONS

International Search Report relating to application PCT/AU2002/001294, dated Oct. 23, 2002.

(Continued)

*Primary Examiner* — Tara Mayo-Pinnock
(74) *Attorney, Agent, or Firm* — Marcus N. DiBuduo; John R. Aaron

(57) ABSTRACT

A subsoil tool for ameliorating soil compaction having a shank attached to a toolbar of a tractor, wings on forward wing links pivotally engaged to the shank, and following wings on a wing rod pivotally engaged with the forward wing link. The forward wing links are positioned near the bottom of the shank in front of the rear of the shank. The wing rod is positioned behind the shank. A power link is engaged to the toolbar, a hydraulic drive cylinder, and the wing rod for enabling oscillation of the wing rod relative to the shank.

30 Claims, 21 Drawing Sheets

(56) References Cited

U.S. PATENT DOCUMENTS

| | | |
|---|---|---|
| 5,540,288 A | 7/1996 | Dietrich |
| 5,668,719 A | 9/1997 | Bobrov et al. |
| 6,178,900 B1 | 1/2001 | Dietrich |
| 6,443,237 B1 | 9/2002 | Myers et al. |
| 8,626,401 B2 | 1/2014 | Tomich |
| 2003/0036852 A1 | 2/2003 | Eii et al. |

FOREIGN PATENT DOCUMENTS

| | | | |
|---|---|---|---|
| RU | 2102844 C1 | 1/1998 | |
| SU | 927918 A1 | 5/1982 | |
| SU | 1011061 A | 4/1983 | |
| SU | 1653554 A1 | 6/1991 | |
| WO | 03/024193 A1 | 3/2003 | |
| WO | WO-2009097641 A1 * | 8/2009 | ............. A01B 13/08 |

OTHER PUBLICATIONS

International Preliminary Examination Report relating to application PCT/AU2002/001294, dated Jan. 20, 2004.
International Search Report and Written Opinion relating to application PCT/AU20008/000137, dated Jun. 4, 2008.

* cited by examiner (CONVENTIONAL TOOL)

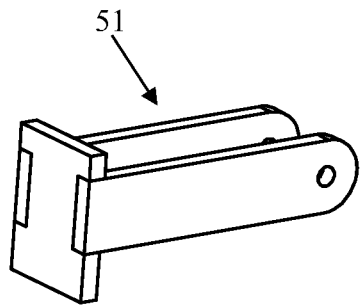
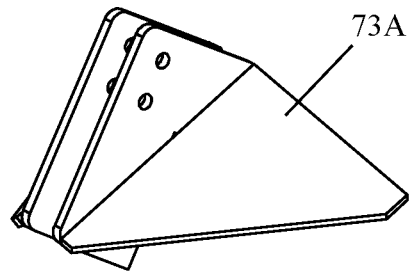
FIG. 13            FIG. 14
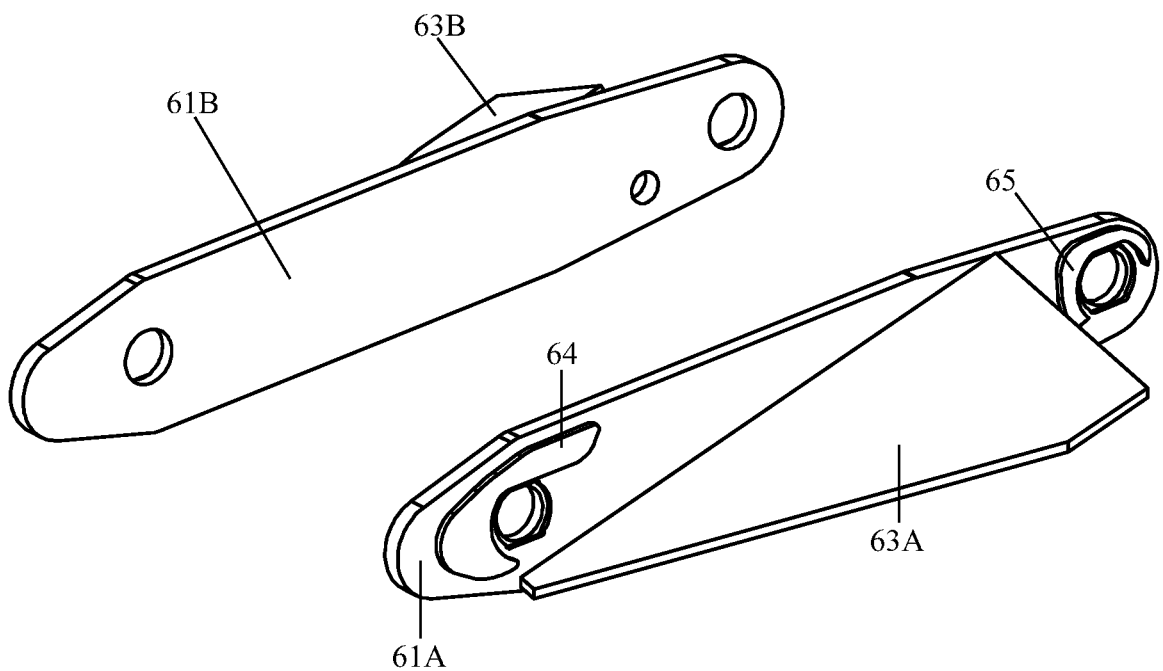
FIG. 15

US 10,597,850 B2

VIBRATING SUBSOIL TOOL

CROSS-REFERENCE TO RELATED APPLICATIONS

This application is a continuation-in-part of pending U.S. Non-provisional application Ser. No. 15/893,486, filed Feb. 9, 2018, which claimed priority to and the benefit of U.S. Provisional Patent Application No. 62/458,444, filed on Feb. 13, 2017, each of which are hereby incorporated by reference in their entirety. This application also claims priority to, and the benefit of, U.S. Provisional Patent Application No. 62/629,716, filed Feb. 13, 2018, which is hereby incorporated by reference in its entirety.

FIELD OF THE INVENTION

The present invention concerns a subsoil tool and method for using the tool for establishing and managing cultivated ground. More particularly, some embodiments of the present invention concern a tool that can be engaged with a tractor having one or more ripper assemblies for soil ripping, each ripper assembly having a shank and one or more oscillating wings.

BACKGROUND OF THE INVENTION

Soil working and site preparation is important for the establishment and survival of cultivated crops. In the absence of adequate soil preparation, crops may struggle because of poor physical soil condition, in particular soil compaction. Compacted soils are not easily penetrated by plant root, which may struggle to assimilate the water and nutrients needed for growth and production. In turn, this leads to a general undesirable loss of plant vigor, and less than optimal performance. The condition of the soil is therefore a limiting factor on the production capacity of the area.

In general, soil ripping is conducted to improve soil condition and create a friable soil that roots of plants are able to penetrate and establish. The roots of any plant need to be encouraged so that they anchor the seedling and grow deep to access water and nutrients. However, current equipment used is not site specific. By contrast, the present invention allows for variability in the type of soil amelioration during use of the tool by reference to soil type and by reference to a soil map database.

Mounding is conducted in conjunction with or following ripping. In effect a raised, friable soil bed is created. This technique improves the benefits of ripping by enhancing water retention, greater soil depth and uniformity of crop.

Single pass tillage implements are known and have been used to perform both shallow and deeper tillage in a single pass. Single pass equipment provides considerable time efficiencies compared with conducting separate operations in multiple passes.

However, in any one area in which cultivation is to be established the soil condition and soil characteristics may vary considerably. Time taken to complete a task is frequently critical in the establishment of a cultivated area and it is hard for a land manager to make more than a relatively crude assessment of the variability of an area of land and of the varying requirement that the soil may have for treatment. The difficulty of this task is exacerbated by the fact that equipment used to perform these vital tasks is of a specialized nature.

In most cases the capital cost of equipment is considerable. This is particularly the case when the equipment is used on only a seasonal basis, or perhaps only as a once off in initial establishment of a cultivated area. Furthermore, the skills required to operate and maintain such equipment are typically beyond the available resources of most landholders. Accordingly, land cultivation is frequently carried out on a contract basis.

Tools and cultivation methods are disclosed in U.S. Pat. No. 8,626,401, incorporated herein by reference, issued to the same inventor of the present improvement (the '401 patent). The conventional tool of the '401 patent, and as shown in FIG. 1 of the present application, includes two shanks mounted to a frame which can be towed by a tractor with two following rollers behind the shanks. Pivotally attached to the shank is a wing member directly engaged with a rod of a ram for rotating the wing.

BRIEF SUMMARY OF THE INVENTION

The inventor has identified improvements on the tool of the '401 patent which, among other things, could be practiced with the methods disclosed therein. In particular, the improved tool of the present invention includes improvements to the wing mechanism and drive thereof as well as improvements to features for protecting the device from the stresses of operation. Some of such improvements include, but are not limited to: different wear plates and guards can be provided and tailored to soil structure; ability to change amplitude and frequency of oscillation of the wings based on soil structure; ability to change wing shape and size relative to soil structure and depth of penetration into the soil; addition of multiple wings achievable of varying angles for purpose of site specific blending of prescribed amendments and fertilizers throughout the soil profile; vertical hydraulic adjustment of shank depth into the soil to allow variable depth ripping in conjunction with prescribed GPS mapping; armored plated shanks with protective iron wear plates to extend life thereof; the use of a hydraulic ram engaged with a "boomerang"-shaped power link increases force applied as well as rate of oscillation resulting in greater soil decompaction efficiency.

Embodiments of the present invention may include one or more ripper assemblies which are attached to the toolbar portion of a tractor. The positioning of the toolbar can be adjusted by one or more hydraulic toolbar cylinders. In some embodiments, a ripper assembly may include a shank, a front wear plate, a wear guard, forward wing links, a wing rod, a power link, and a drive box. In certain embodiments, additional implements, such as a roller, may be attached to a ripper assembly and/or toolbar.

In some embodiments of the present invention, the shape of a shank may be generally parabolic. However, it is to be appreciated that a shank could be a plurality of shapes, which may be contemplated in accordance with the type of soil to be ripped. Furthermore, a shank may have one or more vertical adjustment holes to adjust the position of the shank relative to the toolbar. A shank may be secured by inserting a bolt or other fastener through a vertical adjustment hole and through a mounting hole in the toolbar.

In certain embodiments, a shank may have a pointed front portion terminating in a lower tip which engages the soil. To prevent wear, the lower terminating point of a shank may include a foot having a pointed tooth, which may be removably attached to the shank, so it can be replaced when worn. To prevent wear to the sides of a shank, in some embodiments, one or more armored plates may be welded, or otherwise attached, to one or both sides of a shank.

An additional wear point may exist on the front edge of a shank. As a result, some embodiments of the present invention may include a front wear plate, which may be removably engaged with a shank, so it can be replaced when worn. In certain embodiments, a front wear plate may extend along the front curved portion of a shank. A front wear plate may also have a shape generally the same as the front curved portion of a shank. It is to be appreciated, however, that other shapes are contemplated in accordance with some embodiments of the present invention. In some embodiments, a front wear plate may be engaged to a shank via a tab and bolt (or other fastening means). A shank may have a recess where a tab, engaging a front wear plate to a shank, may be positioned. In certain embodiments, a tab may be partially below portions of a shank covered by a foot or front wear plate that is engaged with a shank. Some embodiments of the present invention may have a front wear plate which may include a main section having a width about equal to that of a shank or that of the combined width of a shank and its armored plate(s). Furthermore, a front wear plate may, in certain embodiments, have a protrusion which can be rectangular, triangular, or any other regular or irregular shape.

Other embodiments of the present invention may include a wear guard at the top straight portion of a shank. A wear guard may be positioned between a gap between a front wear plate and a shank. In some embodiments, a wear guard may include band portions on both sides of a shank. To protect against shearing stresses, a shield may be provided on a wear guard. It is to be appreciated that a plurality of wear guard sizes may be provided depending on, among other things, which vertical adjustment holes are used to attach a shank to a toolbar.

Embodiments of the present invention may include a ripper assembly having a plurality of moveable wings to aid in soil amelioration. One or more forward wing links may be attached to a lower portion of a shank by a pivot. In certain embodiments, one or more forward wing links may include a wing member that may be integrally formed with, or removably attached to, the wing link(s). One or more shields may also be provided on one or more wing links to prevent shearing forces.

A ripper assembly may also include a wing rod, which may be engaged with one or more forward wing links at a forward wing pivot to allow pivotal movement therebetween. In some embodiments, a wing rod may include one or more following wings on either or both sides of the wing rod. A wing rod may also include a plurality of wing adjustment holes for insertion of one or more bolts to engage one or more following wings. In certain embodiments, a shield may be provided on one or more following wings to reduce bolt shearing stresses. It is to be appreciated that, in some embodiments, following wings can be engaged at a plurality of positions. It is further to be appreciated that embodiments of the present invention may include a plurality of wing shapes, designs, and constructions.

Motion of wing links and wing rods may be controlled by one or more hydraulic cylinders directly or indirectly engaged with a toolbar of a tractor, which interact with a power link that is engaged with a wing rod at one or more wing rod pivots, causing movement about a bushing. In some embodiments, a drive box may be directly or indirectly mounted to a toolbar, for example and without limitation, by securing bolts through one or more holes of a bracket of a drive box housing into holes in the toolbar. In preferred embodiments, a hydraulic drive box cylinder may be positioned inside the drive box housing. The drive box cylinder may be indirectly engaged with a wing rod via a power link, in some embodiments, by a rod of the drive box cylinder engaged with a first end of the power link and the wing rod engaged with a second end of the power link. The power link may be rotatably engaged to the drive box cylinder at a medial point. A drive box cylinder may also include one or more ports through which hydraulic fluid may flow.

In some embodiments of the present invention, a ripper assembly may include an improved power link particularly adapted for use in connection with the improved tractor mounting assembly disclosed in U.S. Provisional Patent Application No. 62/629,716 (the "'716 application"). The improved power link may have a generally triangular shape which, at its apexes, may be engaged with a drive cylinder, a toolbar of a tractor, and the wing rod of a ripper assembly. In some embodiments, the improved power link may engage a toolbar of a tractor indirectly, for example, by means of a drive box.

Advantageously, the presently improved tool may be used in accordance with those methods described in the '401 patent. Generally, the improved tool may utilize established soil profiles over an area of land to optimize soil amelioration. Soil profiles may be used to develop a cultivation plan, which can be provided to a computerized controller for configuring the improved tool. As a tractor, equipped with the improved tool, is driven through the land, the computerized controller can receive tractor position information and operate hydraulic pumps associated with the toolbar cylinders and drive box cylinders, so that each move in accordance with the cultivation plan.

BRIEF DESCRIPTION OF THE DRAWINGS

FIG. 13 is a front perspective view of wear guard in accordance with some embodiments of the present invention.

FIG. 14 is a perspective view of a following wing in accordance with some embodiments of the present invention.

FIG. 15 is another exploded front perspective view of exemplary forward wings and forward wing links in accordance with some embodiments of the present invention.

DETAILED DESCRIPTION OF INVENTION

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles, or other measurements provided. Rather the invention, as defined by the claims, may cover alternatives, modifications, and/or equivalents of the exemplary embodiments.

Exemplary Ripper Assembly, Tool, and System

Referring now to the exemplary illustrations, where like reference numbers represent like items, and in particular to FIGS. 2-6, at least one ripper assembly 10 can be attached to a toolbar 5 portion of a tractor. The position of toolbar 5 relative to the tractor can be changed by a plurality of hydraulic toolbar cylinders 3. Although there are three ripper assemblies shown attached to the toolbar in FIG. 2, it is to be appreciated that embodiments of the present invention include any number of ripper assemblies.

Figure 1:
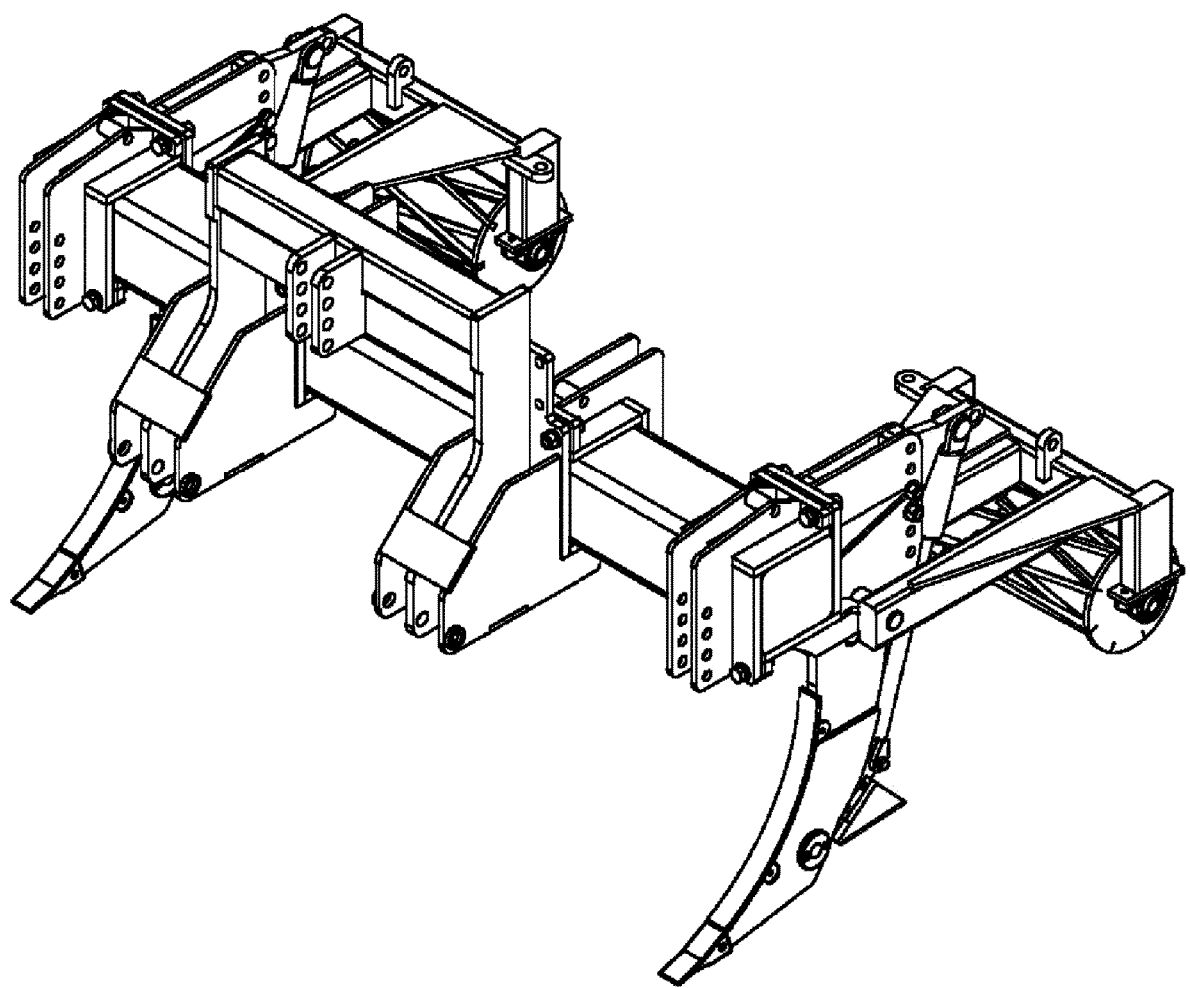
FIG. 1 is a perspective view diagram illustrating the conventional tool shown in the '401 patent.
Figure 3:
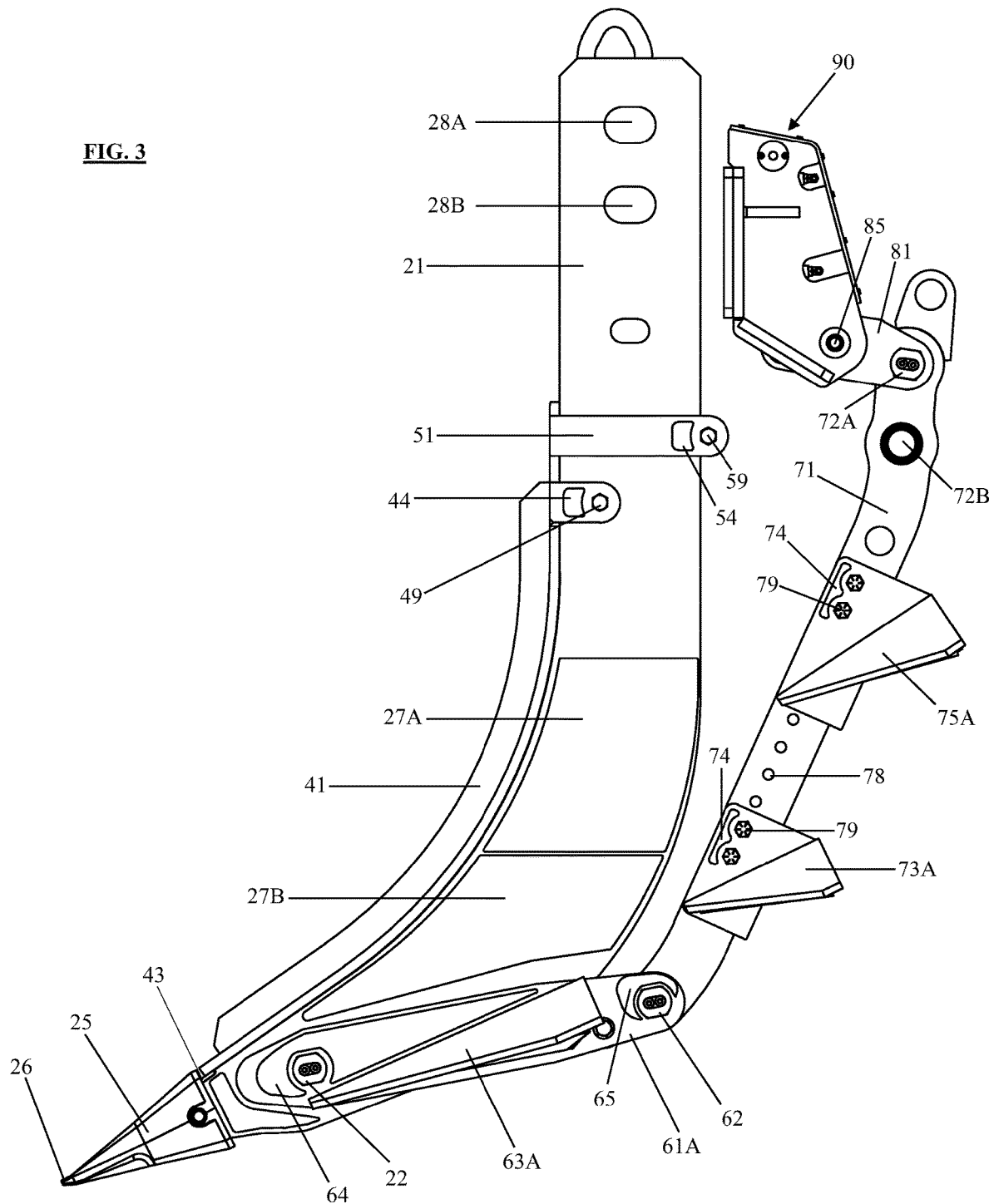
FIG. 3 is a side view diagram illustrating a ripper assembly in accordance with some embodiments of the present invention.

As shown more particularly in the exemplary illustration of FIG. 3, ripper assembly 10 may include shank 21, front wear plate 41, wear guard 51, forward wing link 61A, forward wing link 61B (seen in the cutaway illustration of FIG. 6), wing rod 71, power link 81, and drive box 90. In some embodiments, additional implements may be attached to a ripper assembly and toolbar. For example, and without limitation, a roller, such as that depicted in the '401 patent (shown in FIG. 1), may be attached to a ripper assembly 10 and/or toolbar 5.

Shank 21 can generally have a parabolic shape having a pointed front portion terminating in a lower tip and a generally straight and vertical rear portion. It is to be appreciated, however, that other shapes are contemplated in accordance with some embodiments of the present invention. For example, and without limitation, shank 21 can include a "J" shape. The top of shank 21 may include one or more vertical adjustment holes 28A, 28B for adjusting the position of shank 21 relative to toolbar 5. Shank 21 may be inserted into a slot of toolbar 5 and a fastener (for example, and without limitation, a bolt) may be inserted through one of vertical adjustment holes 28A, 28B and through a mounting hole in toolbar 5. It is to be appreciated that securement of shank 21 to toolbar 5 through the lower vertical adjustment hole 28B will cause shank 21 to be positioned higher relative to the soil than if shank 21 was secured to toolbar 5 through the upper vertical adjustment hole 28A.

Figure 6:
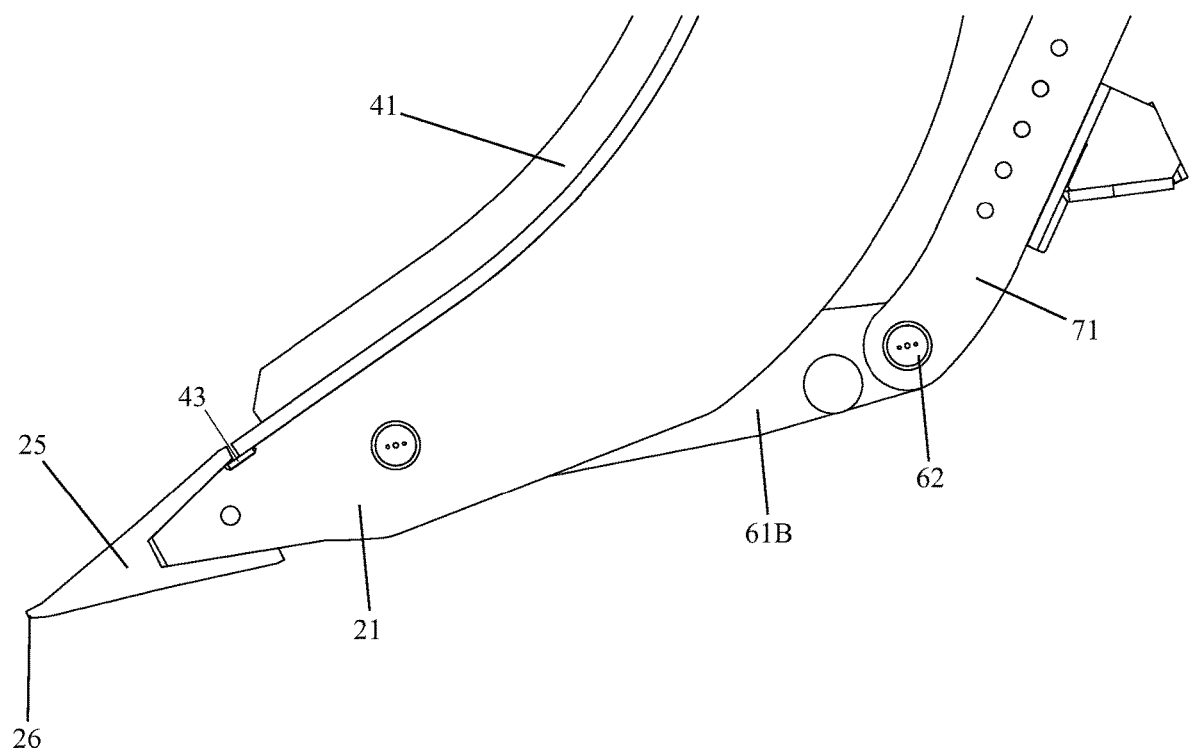
FIG. 6 is a cutaway (or cross-sectional) view diagram illustrating the lower portion of a ripper assembly in accordance with some embodiments of the present invention.
Figure 17:
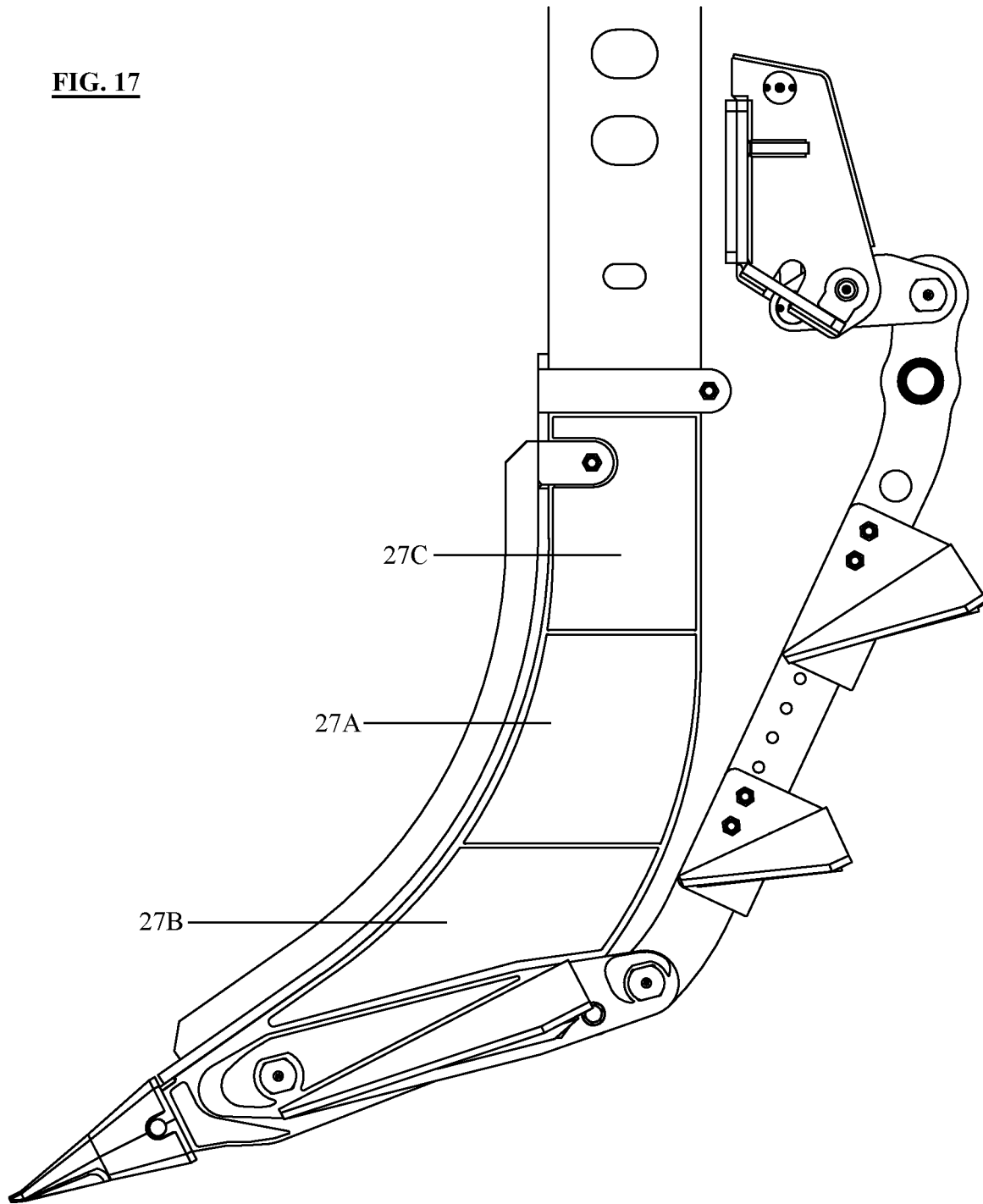
FIG. 17 is a side view diagram illustrating a ripper assembly in accordance with some embodiments of the present invention.

It is to be appreciated that the forward and lower termination points of shank 21, in operation, are the most forward portions of the ripper assembly 10 that engage the soil and are wear points. In some embodiments, foot 25 having pointed tooth 26 may be removably attached to the forward portion of shank 21 (as can be seen in FIG. 6), so that it can be replaced when worn instead of requiring replacement of the entirety of shank 21. Additional wear points are on the side of shank 21. In some embodiments, one or more armored plates can be provided on one or more sides of the shank. For example, and without limitation, armored plates 27A, 27B can be provided on the side of shank 21 (and additional armored plates can be provided on the other side of the shank). In some embodiments, as shown in FIG. 17, armored plates 27A, 27B, 27C can extend along the length of shank 21 which is to be inserted into the soil. In preferred embodiments, armored plates 27A, 27B, 27C can be welded to shank 21, however, it is to be appreciated that other attachments means are contemplated in accordance with some embodiments of the present invention. For example, the armored plates can be removably engaged with the shank via one or more fasteners so that they may be replaced when worn.

Figure 16:
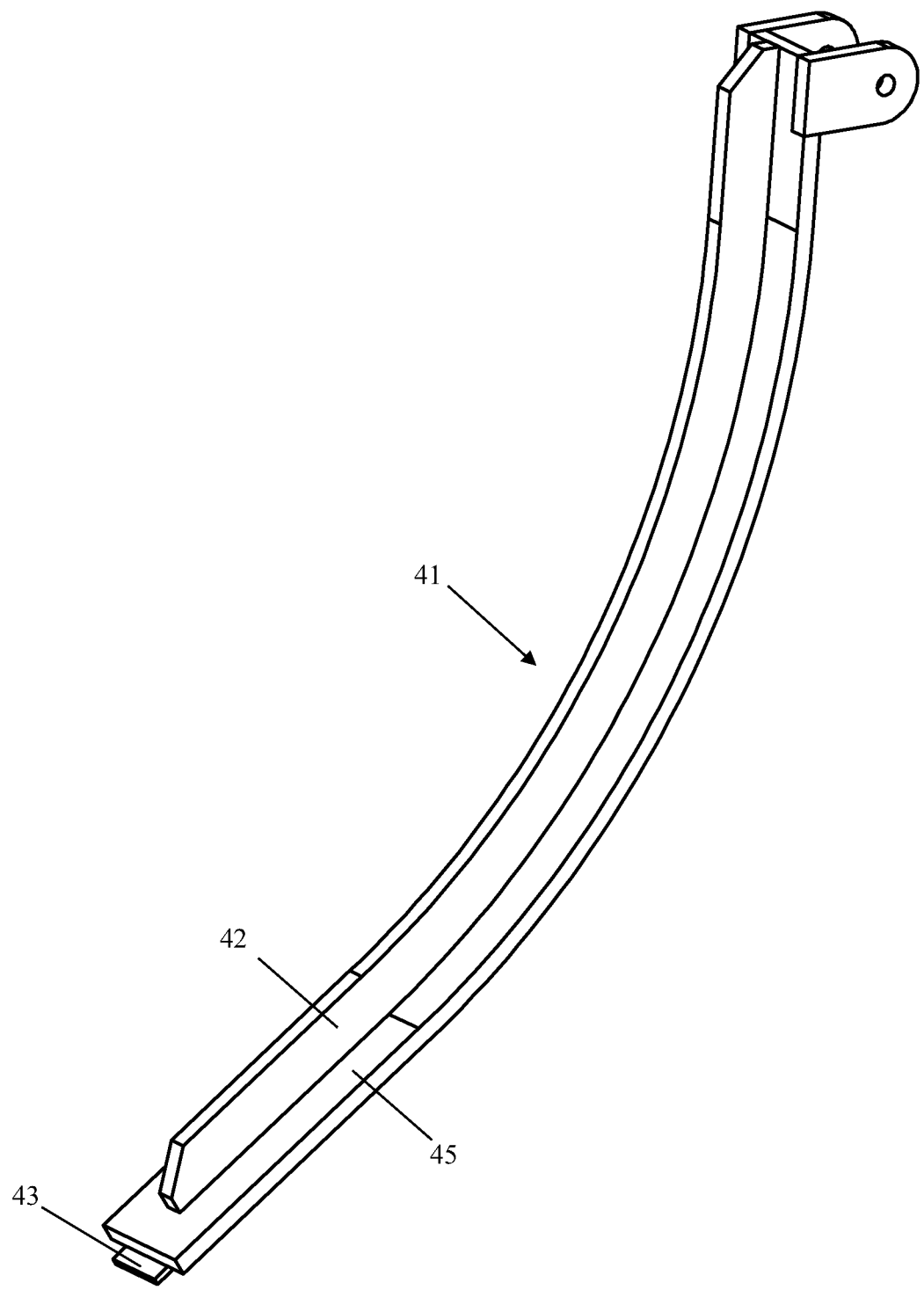
FIG. 16 is a front perspective view of a front wear plate in accordance with some embodiments of the present invention.

Another wear point is on the front edge of shank 21. In some embodiments, front wear plate 41 may be removably engaged with shank 21, so that it can be replaced when worn instead of requiring replacement of the entirety of shank 21. In some embodiments, front wear plate 41 may extend along the front curved portion of shank 21. Front wear plate 41 can have a shape generally the same as the front edge of shank 21, and can be engaged to shank 21 via tab 43 and bolt 49. As illustrated in FIG. 6, shank 21 may have a recess in the bottom portion wherein tab 43 of front wear plate 41 may be positioned. In some embodiments, the recess may be partially below that portion of shank 21 covered by foot 25 when foot 25 is engaged with shank 21. In preferred embodiments, and as illustrated in FIGS. 3 and 16, front wear plate 41 may have a main section 45 having a width about equal to the combined width of shank 21 and the armored plate(s). In some embodiments, front wear plate 41 may also have a narrower forward facing protrusion 42 which can be rectangular, triangular, or any other shape. For example, and without limitation, protrusion 42 may have a "blade" type configuration (as shown in FIG. 16) for use in rocky soil. In other examples, the protrusion may have a concave rib or member nearly extending the width of main section 45 for use in clay soil. It is to be appreciated, however, that front wear plate 41 may omit any protrusion, which is particularly useful with sandy soil. To protect bolt 49 from shear stresses in operation, front wear plate 41 may include shield 44 forward of bolt 49 and extending outwardly relative to shank 21.

In preferred embodiments, wear guard 51 may also be provided at the top portion of shank 21 (as shown in FIG. 3). Wear guard 51 may have a front lower portion that can be positioned between, and thus retained by, a uppermost gap between front wear plate 41 and shank 21. It is to be appreciated that a plurality of sizes of wear guard 51 may be provided depending on, among other things, which vertical adjustment holes 28A, 28B are used to attach shank 21 to toolbar 5. In some embodiments, wear guard 51 may include band portions on both sides of the shank (best seen in FIG. 13) terminating at connecting bolt 59. Shield 54 may be provided on wear guard 51 to protect against shearing stresses. In preferred embodiments, a longer wear guard is to be utilized when the upper vertical adjustment hole 28A is used to attach shank 21 to toolbar 5.

Figure 2:
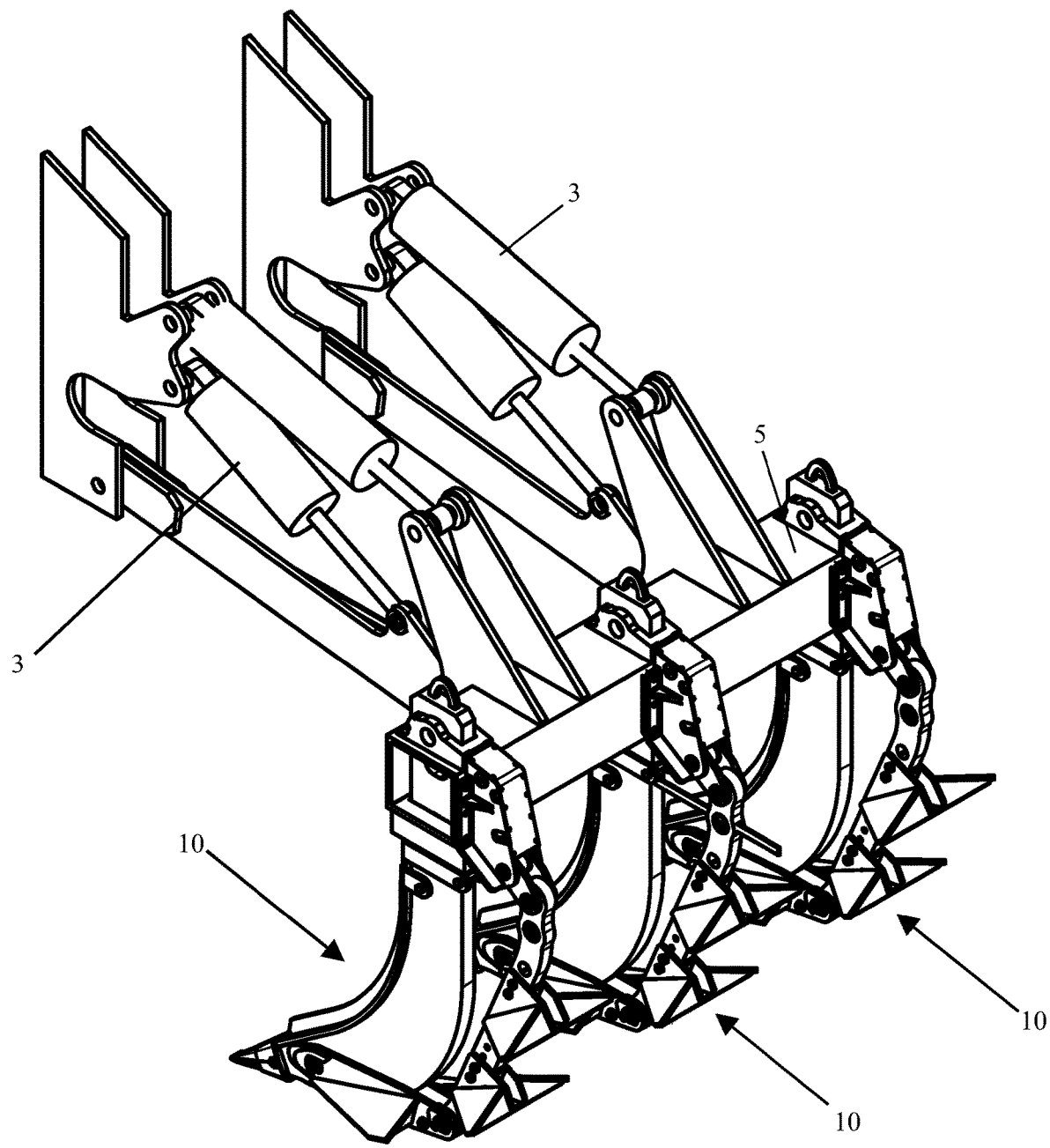
FIG. 2 is a perspective view diagram illustrating a tool in accordance with some embodiments of the present invention.

Advantageously, the ripper assembly may include a plurality of movable wings to aid in soil amelioration. Forward wing link 61A and forward wing link 61B (on the other side of shank 21 as shown in FIG. 6) may be attached to shank 21 on a lower portion thereof by shank pivot 22. In preferred embodiments, forward wings links 61A, 61B can be symmetrical along a center line at which they are engaged with shank 21. In certain embodiments, a center line may be an axis defined by shank 21. Shank pivot 22 permits forward wing links 61A, 61B to pivot at an end thereof relative to shank 21. Each of forward wing links 61A, 61B may include a wing member, for example, forward wing link 61A may have forward wing 63A. Forward wing 63A, in preferred embodiments, is integrally formed with forward wing link 61A. However, in some other embodiments, the forward wings may be removably attached to the forward wing links. One or more shields 64, 65 may be provided on the forward wing links 61A, 61B to protect against shearing stresses. Wing rod 71 may be engaged with each of forward wing links 61A, 61B at forward wing pivot 62 to permit pivotal movement therebetween. Wing rod 71 can include one or more following wings 73A, 73B, 75A, 75B. It is to be appreciated that, as shown in FIG. 2, following wings are on both sides of wing rod 71. Advantageously following wings 73A, 73B, 75A, 75B can, in some embodiments, be placed at a plurality of positions. Wing rod 71 may include a plurality of wing adjustment holes 78 along a portion of the length thereof through which bolts 79 may be inserted for engaging the following wings 73A, 73B, 75A, 75B. Analogous to the other bolts, shields 74 may be positioned on following wings 73A, 73B, 75A, 75B to reduce bolt shearing stresses.

Figure 4:
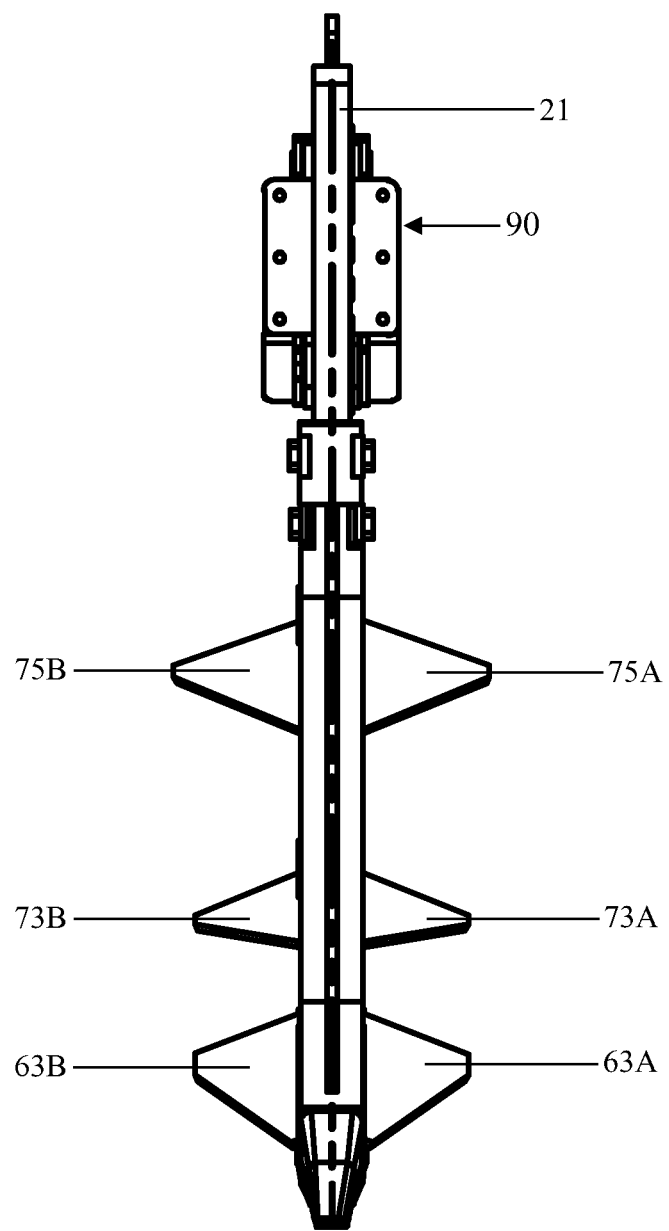
FIG. 4 is a front view diagram illustrating a ripper assembly in accordance with some embodiments of the present invention.
Figure 9:
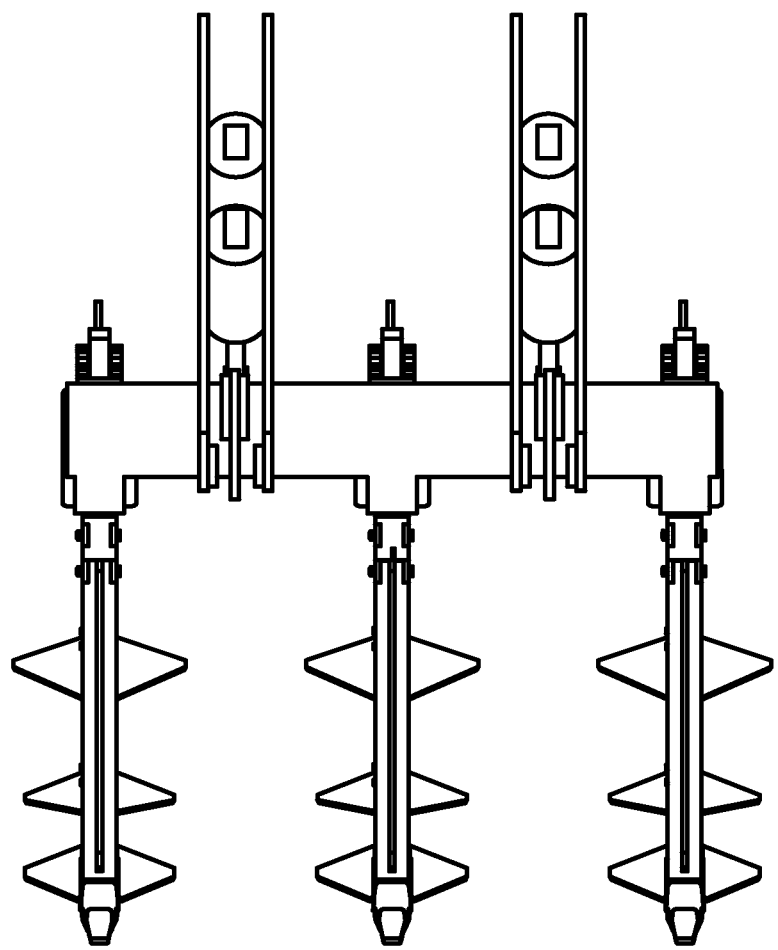
FIG. 9 is a rear view diagram illustrating a tool in accordance with some embodiments of the present invention.
Figure 10:
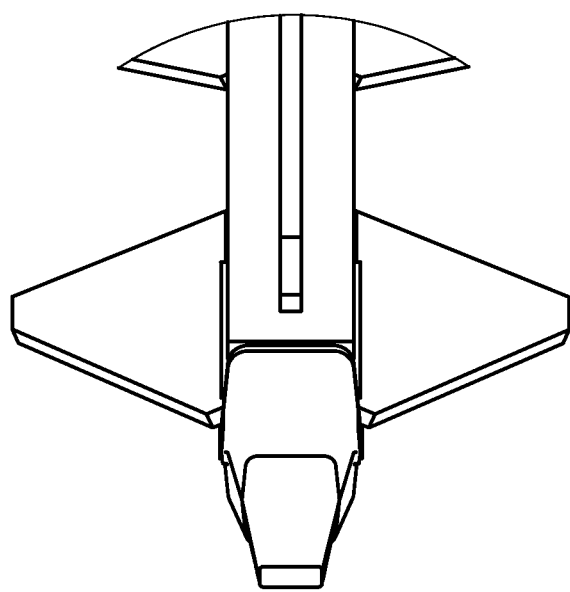
FIG. 10 is a magnified view of the lower front portion of a shank illustrated in FIG. 9.

With reference to FIGS. 4, 9, and 10, in preferred embodiments, following wings 73A, 73B can be symmetrical along a center line at which they are engaged with wing rod 71 (i.e., protrusions from each side of wing rod 71 are about the same). Likewise, following wings 75A, 75B can be symmetrical along a center line at which they are engaged with wing rod 71. Similarly, in preferred embodiments, each of forward wings 63A, 63B can be symmetrical along a center line at which they are indirectly engaged (by forward wing links) with shank 21. In certain embodiments, a center line may be an axis defined by wing rod 71 or shank 21. Following wings 73A, 73B may be symmetrical with following wings 75A, 75B, or as illustrated, may be different. However, it is to be appreciated that embodiments of the invention include other wing shapes, designs, and constructions. In some embodiments, when three ripper assemblies are attached to a toolbar, the forward wings and following wings may have a similar configuration (for example, and without limitation, as shown in FIG. 9 the wing configuration of each ripper assembly may be similarly configured). It is to be appreciated however that the wing configurations on a single ripper assembly may vary and the wing configurations on different ripper assemblies may vary. Further, the distal protrusion of the individual wings from a shank may vary, as well the distal protrusion of the different wings on different shanks may vary. It is further to be appreciated that the shapes and configurations of the multiple forward wings and following wings as illustrated in the drawings are not meant, nor should be interpreted, as limiting the scope of the invention (i.e., some embodiments of the invention concern tools having asymmetrical forward wings and following wings, and differing forward wing and following wing configurations on the same or on different ripper assemblies).

Figure 11:
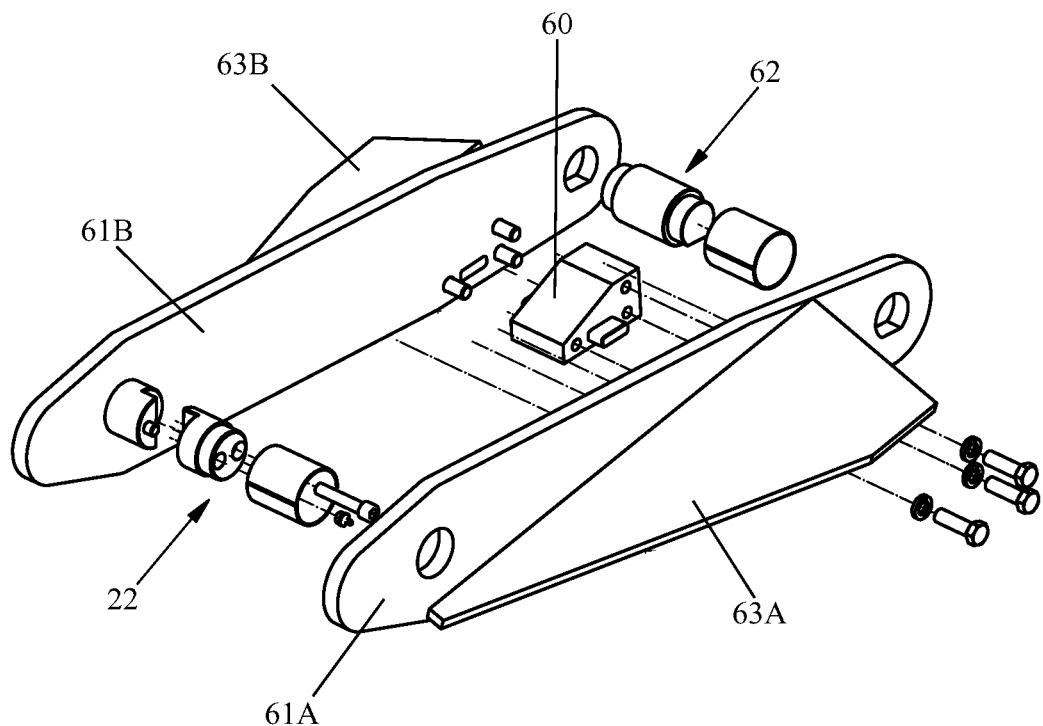
FIG. 11 is an exploded front perspective view of exemplary forward wings and forward wing links in accordance with some embodiments of the present invention.
Figure 12:
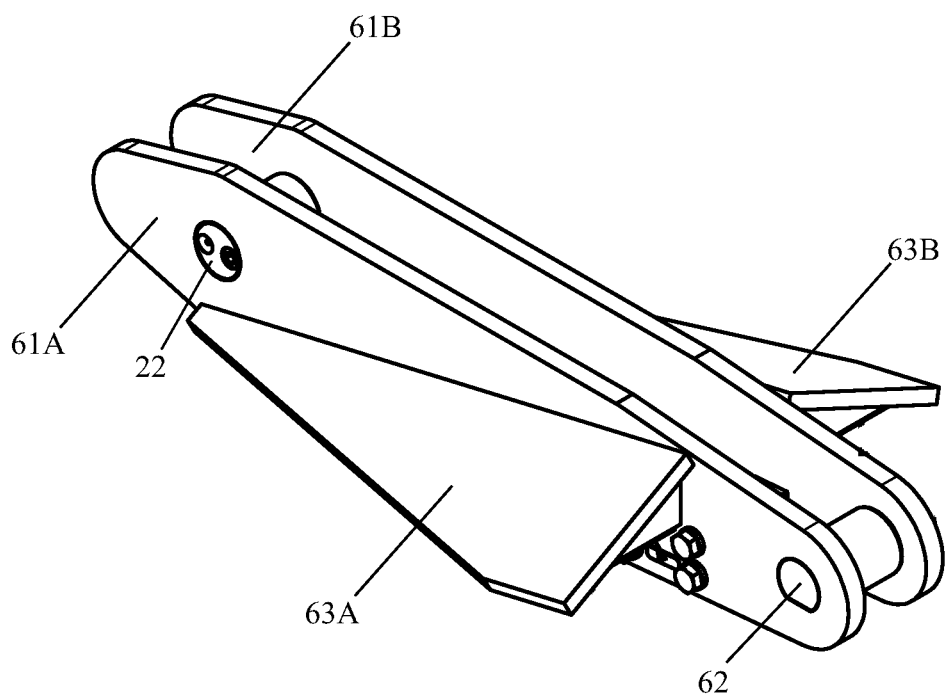
FIG. 12 is a rear perspective view of exemplary forward wings and forward wing links in accordance with some embodiments of the present invention.

FIGS. 11 and 12 show exploded and assembled, respectively, perspectives of forward wing links 61A, 61B and forward wings 63A, 63B in accordance with some embodiments of the present invention. In accordance with some embodiments of the present invention, forward wings 63A, 63B may be integrally formed with forward wing links 61A, 61B, may be fixedly engaged via one or more fasteners, or may be permanently attached (for example by welding) to forward wing links 61A, 61B. As illustrated, both of the forward wings 63A, 63B (on either side of the shank) can, in some embodiments, be mirror images and forward wing links 61A, 61B may be joined together. In some embodiments, shank pivot 22 may comprise multiple components which are fitted together. Similarly, forward wing pivot 62 may also comprise multiple components which are fitted together. Forward wing links 61A, 61B may be stabilized and engaged together by spacer 60. In some embodiments, spacer 60 may include holes, slots, and/or tabs and be secured by one or bolts, as illustrated in FIGS. 11 and 12. However it is to be appreciated that other mechanisms of attachment of the forward wing links are contemplated in accordance with some embodiments of the present invention. For example, and without limitation, FIG. 15 illustrates another embodiment in which forward wings links 61A and 61B may engaged by a single hole through which a pin or bolt may be inserted. Forward wing links 61A, 61B may also include shields that are placed near the shank pivot and forward wing pivots.

Figure 7A:
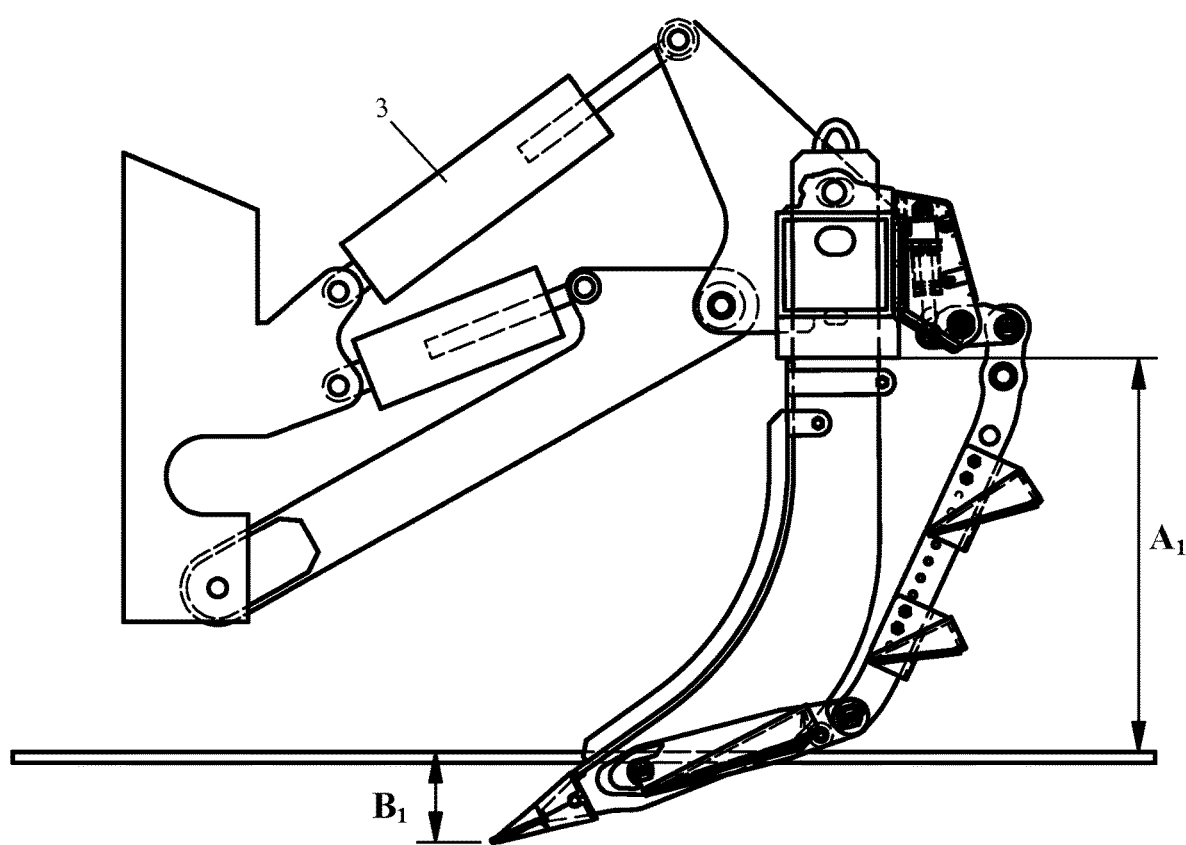
FIGS. 7A through 7C are side view diagrams illustrating how different configurations of the toolbar cylinders orient, relative to the soil, a ripper assembly in accordance with some embodiments of the present invention.
Figure 7B:
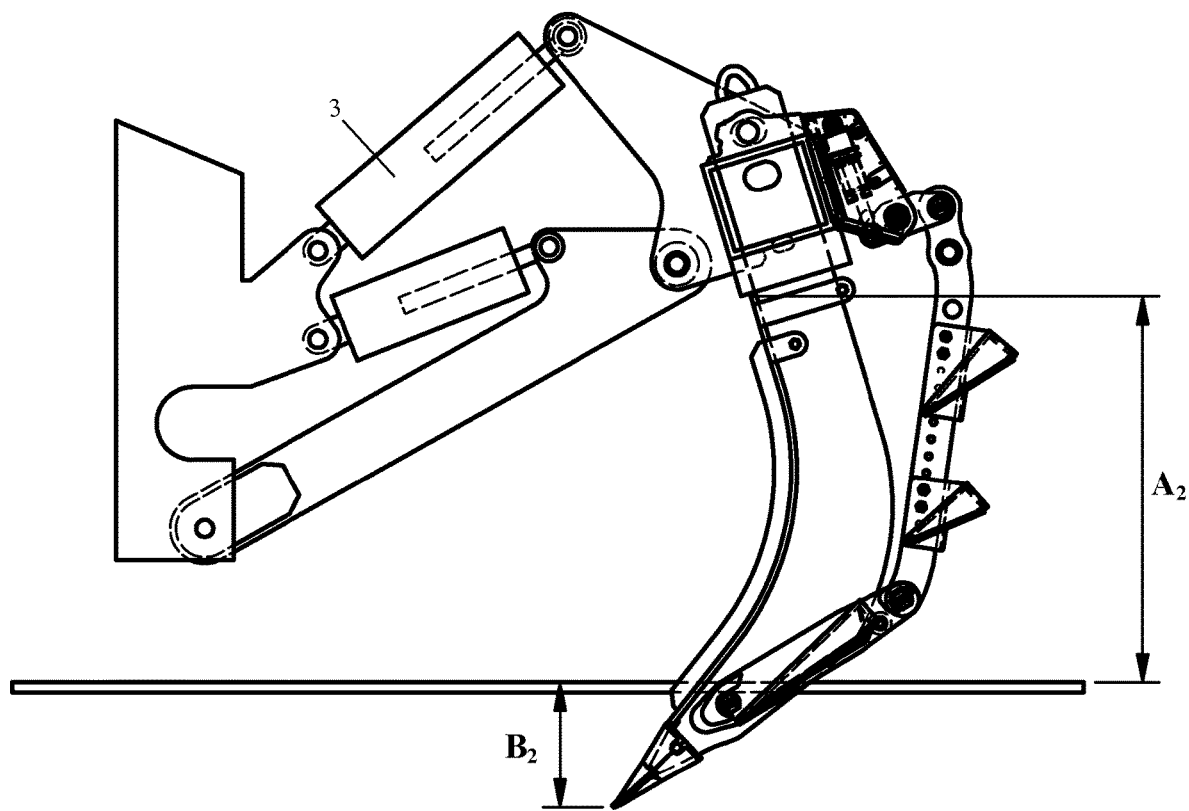
Figure 7C:
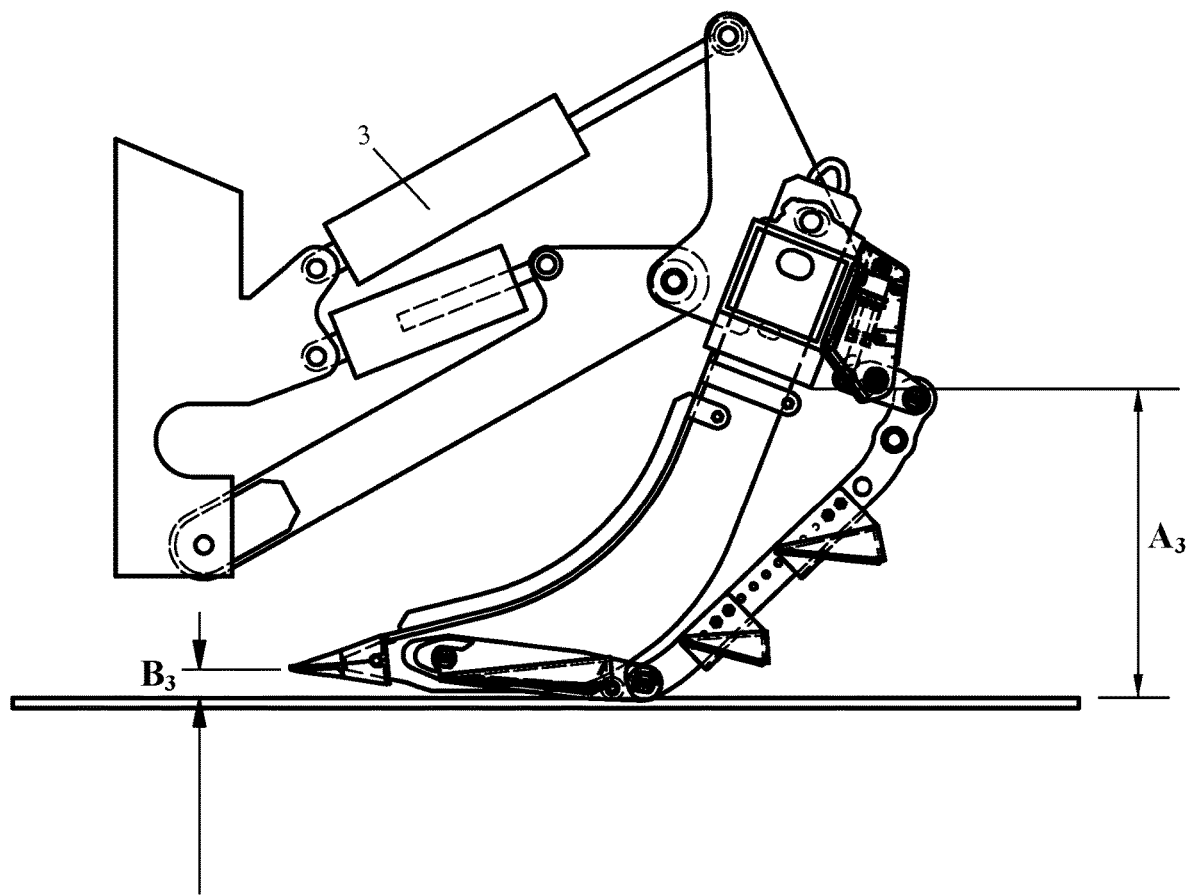

Referring now to FIGS. 7A, 7B, and 7C, vertical and rotational adjustment of the shank may be made by adjustment of toolbar cylinders 3. As illustrated in the figures, the upper toolbar cylinder may control the rotation of the ripper assembly and the lower toolbar cylinder may control the vertical displacement of the ripper assembly. FIG. 7A illustrates partial extension of the upper toolbar cylinder, FIG. 7B shows maximal retraction of the upper toolbar cylinder, and FIG. 7C depicts maximal extension of the upper toolbar cylinder. It can be seen that whether upper toolbar cylinder is maximally extended, maximally retracted, or somewhere in between, the height of the toolbar and thus upper portion of the shank is about the same (e.g., height A1 of FIG. 7A, height A2 of FIG. 7B, and height A3 of FIG. 7C is about the same). On the other hand, the extension or retraction of the upper toolbar cylinder affects the rotation of the shank and thus the operating depth of the lower portion or foot of the shank. For example, maximal extension of the upper toolbar cylinder as shown in FIG. 7C may rotate the shank forwards towards the tractor thus causing the foot of the shank to be positioned at a height above the soil (height B3), while maximal retraction of the upper toolbar cylinder as shown in FIG. 7B may rotate the shank rearwards from the tractor thus causing the foot of the shank to be positioned at a height below the soil (height B2). Partial extension of the upper toolbar cylinder, as shown in FIG. 7A may position the shank generally vertical having a height B1 relative to the soil between height B3 of FIG. 7C and B2 of FIG. 7B. Similarly, in contrasting the illustration of FIG. 7A (wherein the upper toolbar cylinder is partially extended and the lower toolbar cylinder is maximally retracted) and the illustration of FIG. 8A (wherein the upper toolbar cylinder is partially extended and the lower toolbar cylinder is maximally extended), it is evident that the lower toolbar cylinder can position the entirety of the shank, and the foot, deeper in the soil to a height B4 when the lower toolbar cylinder is maximally extended than the height B1 when the lower toolbar cylinder is maximally retracted. It is to be appreciated that the foregoing discussion is meant to illustrate, in accordance with some embodiments of the present invention, the relative positioning and rotation of the shank as controlled by one or more toolbar cylinders.

Motion of the forward wing links and wing rods (and thus the forward wings and following wings) may be enabled by hydraulic elements, such as one or more hydraulic cylinders. In some embodiments, hydraulic elements in drive box 90 may enable motion of the forward wing links and wing rods, by oscillating power link 81 about bushing 85, which is engaged with wing rod 71 at wing rod pivots 72A or 72B. Referring now to the cutaway view of FIG. 5, wing rod 71 may include one or more wing rod pivots 72A, 72B to which power link 81 may be engaged. It is to be appreciated that the selection of to which of wing rod pivots 72A and 72B is engaged to power link 81 can be made with reference to, among other things, the amount of upward travel of wing rod 71 is desired, the speed at which wing rod 71 is to be moved, and the power of the hydraulics.

Drive box 90 may be mounted directly or indirectly to toolbar 5, for example, and without limitation, by bracket 98 of housing 91 having holes therein through which bolts (not shown) can be inserted. In preferred embodiments, a hydraulic drive box cylinder 93 may be positioned on the inside of housing 91 of drive box 90. Drive box cylinder 93 may be directly or indirectly engaged with wing rod. In preferred embodiments, drive box cylinder 93 may be indirectly engaged with wing rod 71 by (i) pivotal engagement of cylinder rod 96 to a first end of power link 81 via connecting pin 92 and (ii) pivotal engagement of wing rod 71 to a second end of power link 81 via wing rod pivots 72A or 72B. Drive box cylinder 93 may include ports 94A, 94B through which hydraulic fluid may flow to operate the drive box cylinder. As hydraulic fluid is provided into drive box cylinder 93 through port 94A, cylinder rod 96 extends outwardly, rotating power link 81 counterclockwise (accordingly to the exemplary configuration illustrated in FIG. 5) about bushing 85. After cylinder rod 96 has been extended from drive box cylinder 93, hydraulic fluid can be provided through port 94B, which retracts cylinder rod 96, and causes power link 81 to rotate clockwise about bushing 85.

Cycling hydraulic fluid through ports 94A, 94B thus causes the wings of the present invention to oscillate, which when inserted into the soil, improves amelioration. In some embodiments, the oscillation frequency may be between 0.1 and 4 cycles per second, and preferably, one cycle per 0.8 seconds (or 1.25 cycles per second). However, it is to be appreciated that other frequencies are contemplated in accordance with embodiments of the present invention. It is also to be appreciated that, when two or more ripper assemblies are provided on the toolbar, each can have the same or different oscillating frequencies.

Exemplary Operation of the Improved Tool

Figure 8A:
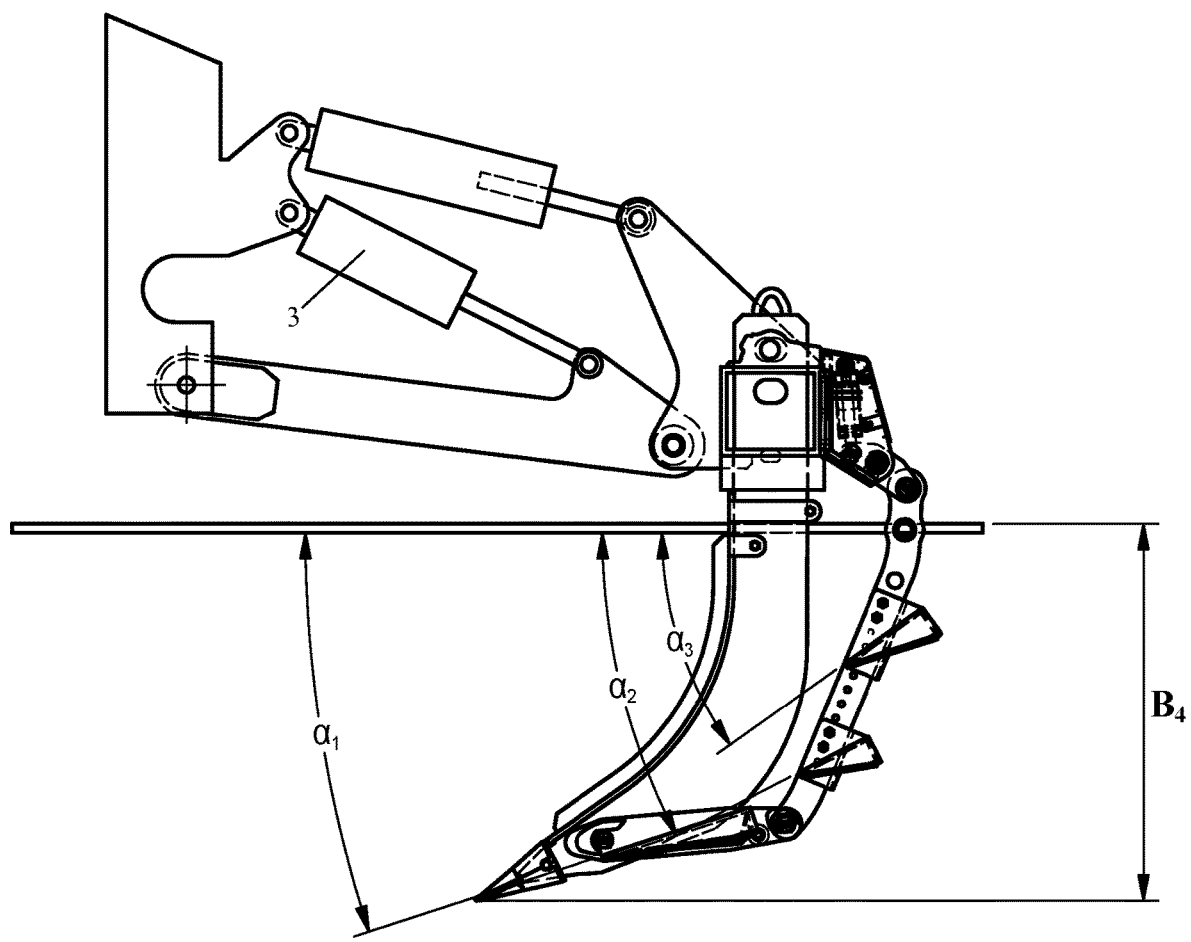
FIGS. 8A and 8B are side view diagrams illustrating how different configurations of the toolbar cylinders can vary the relative angles of the shank and wings in accordance with some embodiments of the present invention.
Figure 8B:
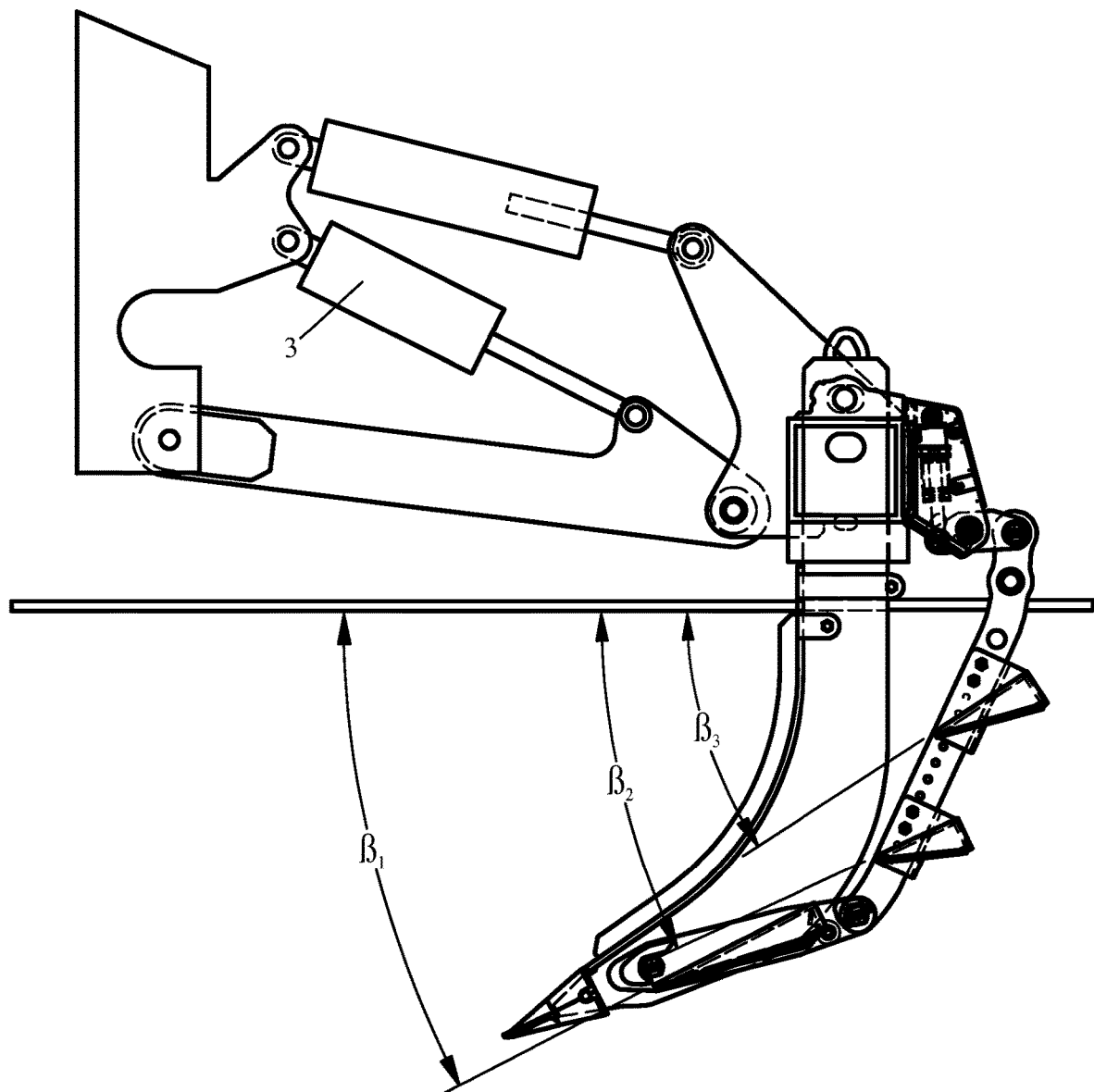

Referring now to FIGS. 8A and 8B, as the cylinder rod of the drive box cylinder motions from the down position to the raised position, it pushes or pulls on the power link which applies the opposite action to the wing rod, initiating the motion of the following wings and the forward wings. As the cylinder rod moves through its motion, the forward wings travel through an arc while the following wings rotate through an arc as well as move slightly forward or backward. The change in degree applies pressure to the soil as it flows over the face of the forward wings and the following wings. As this pressure is applied to the soil, it causes the soil particles to rupture and split apart creating a smooth and homogenous tilth. As the soil slides over the faces of the wings, it cascades off into the open space beneath the wings and allows for better blending of stratified soils. The vertical pressure applied to the soil by the angular surfaces of the wing when the cylinder rod is maximally extended (e.g., the condition illustrated in FIG. 8B) causes lift in the soil, while the rotational motion of the wing causes the mixing effect. As the forward wings and following wings motion upward, they create a momentary increase in the draft applied to the tractor as a vertical load which can increase the tractive efficiency of the tractor. When the forward wings and following wings motion downward, the load is released and the tractor operates under a normal load scenario. While the forward wings rotate upward, it increases in angle, while the following wings decrease in angle. This allows for a more consistent soil movement.

As illustrated, the angles of the wings relative to the nominal soil grade vary throughout cycling of the wing rod. When the cylinder rod is maximally retracted, as illustrated in FIG. 8A, the forward wings have angle $\alpha 1$ relative to the soil grade, the lower following wings have angle $\alpha 2$ relative to the soil grade, and the upper following wings have angle $\alpha 3$ relative to the soil grade. Similarly, when the cylinder rod is maximally extended, as illustrated in FIG. 8B, the forward wings have angle $\beta 1$ relative to the soil grade, the lower following wings have angle $\beta 2$ relative to the soil grade, and the upper following wings have angle $\beta 3$ relative to the soil grade. Angles $\alpha 1$, $\alpha 1$, and $\alpha 3$ are smaller, respectively, than angles $\beta 1$, $\beta 2$, and $\beta 3$.

In preferred embodiments, the forward wings are provided with flatter angles as the tooth falls deeper and are provided with steeper angles as the tooth rises to shallower depths. Along with the forward wings, the following wings angle relationship corresponds to the overall depth. The deeper the forward wings and following wings travel, the narrower the overall size is required to be for similar effect on the soil. As the forward wings and the following wings decrease in depth, the size of the angular surface must increase to positively work the soils.

Exemplary Method of Using the Improved Tool

The presently improved tool is particularly well suited for, and provides significant benefits to, amelioration of contiguous land having varying soil profiles. The presently improved tool is well suited for methods of use which are the same, with or without modification, to those described in the '401 patent.

More particularly, a plurality of soil profiles at predetermined intervals over an array over an area of soil to be cultivated could be surveyed and established. In some embodiments, the soil profiles can include things such as crop yield information, extent of soil compaction, any existing root depth and width, physical, chemical, nutritional, or environmental factors which affect soil performance (both at the surface and sub-surface level), and soil types. This information can also include historical surveys as well as prior amelioration protocols. The array of information can be placed in a database along with positioning information (for example, and without limitation, GPS coordinates) to assist in the amelioration.

Once the soil profiles are established, a treatment or cultivation plan can be prepared. The plan can include, for example and without limitation, for each element in the array, the depth to which the soil should be ripped, the oscillating frequency of the wings, whether soil amendments or fertilizer should be added, the particular size, shape, positioning and number of wings to be provided, the number of ripping assemblies to be used, the insertion height(s) of the shank(s) into the toolbar (i.e., which vertical adjustment hole to use), the insertion depth(s) of the shank(s) into the soil, the rotational position(s) of the shank(s), and the height of the wing rod relative to the power link (i.e., which ring rod pivot to use).

Use of the presently improved tool can then be made in accordance with the plan. After the tool is configured in accordance with the plan, as the tractor is driven through the land, speed and position information may be determined by a location determining apparatus (for example, and without limitation, a GPS receiver) and transmitted to a computerized controller with an electronically readable form of the cultivation plan. The electronically readable cultivation plan can comprise instructions in a memory element associated with said computerized controller. The computerized controller can compare the position of the tractor to the coordinates in the plan array and determine, among other things, the rotation of the shank(s) and insertion depth(s) thereof into the soil, along with the height and oscillating frequency of the wings. This information can be translated and can be conveyed to hydraulic pumps associated with the toolbar cylinder(s) and the drive box cylinder(s). As the tractor moves, based on the position of the tractor, the toolbar and drive box cylinders move automatically in accordance with the amelioration plan.

Improved Power Link

In some aspects, the present invention provides an improved power link (and configurations including such power links) for driving the wing rod of a ripper assembly via a drive cylinder. In accordance with some embodiments of the present invention, certain improved power link configurations in accordance with embodiments of the present invention are particularly adapted for use in connection with the improved tractor mounting assembly of the '716 application.

Figure 18:
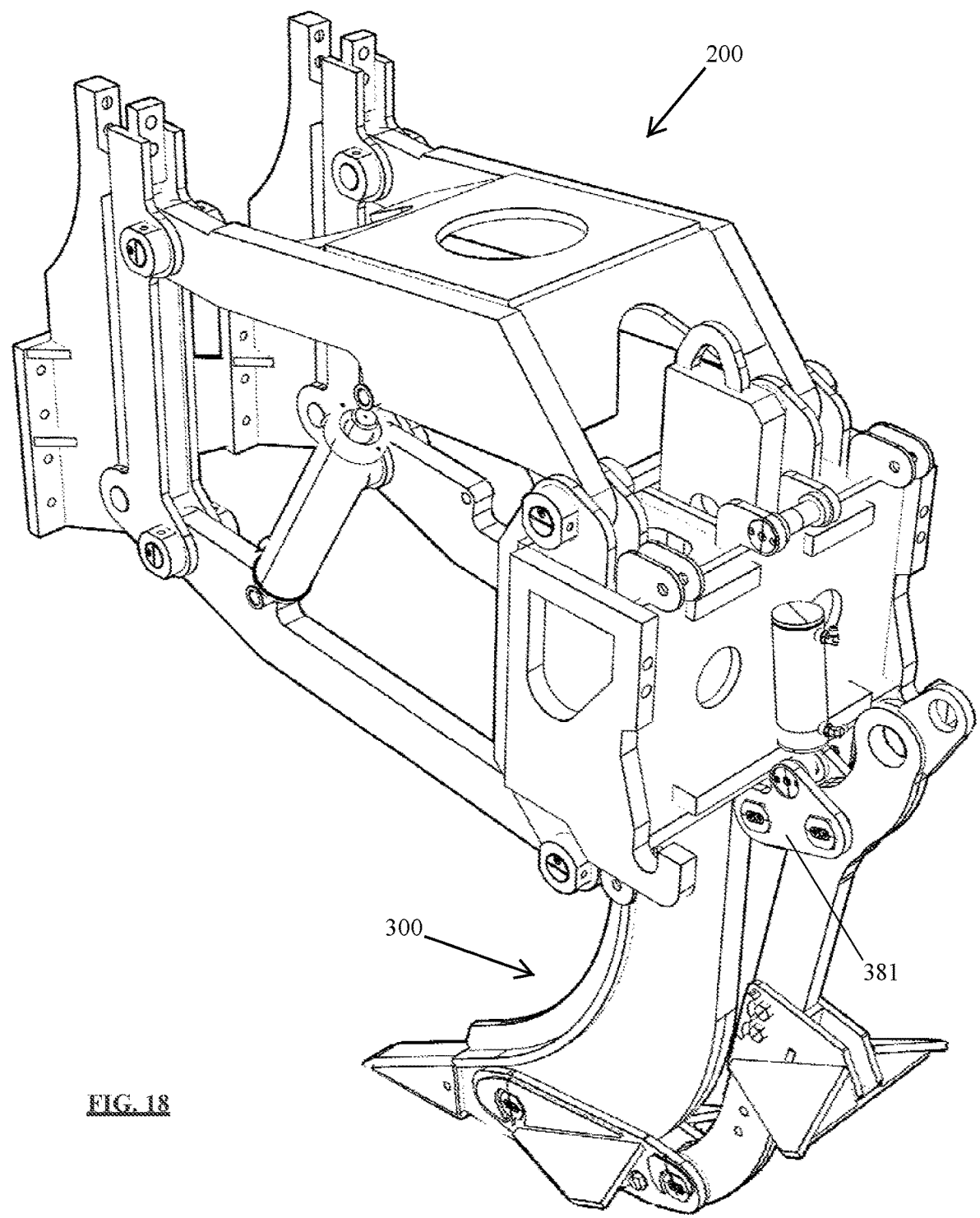
FIG. 18 is a perspective view diagram illustrating a ripper assembly, in accordance with some embodiments of the present invention, engaged with a toolbar of mounting assembly.
Figure 19:
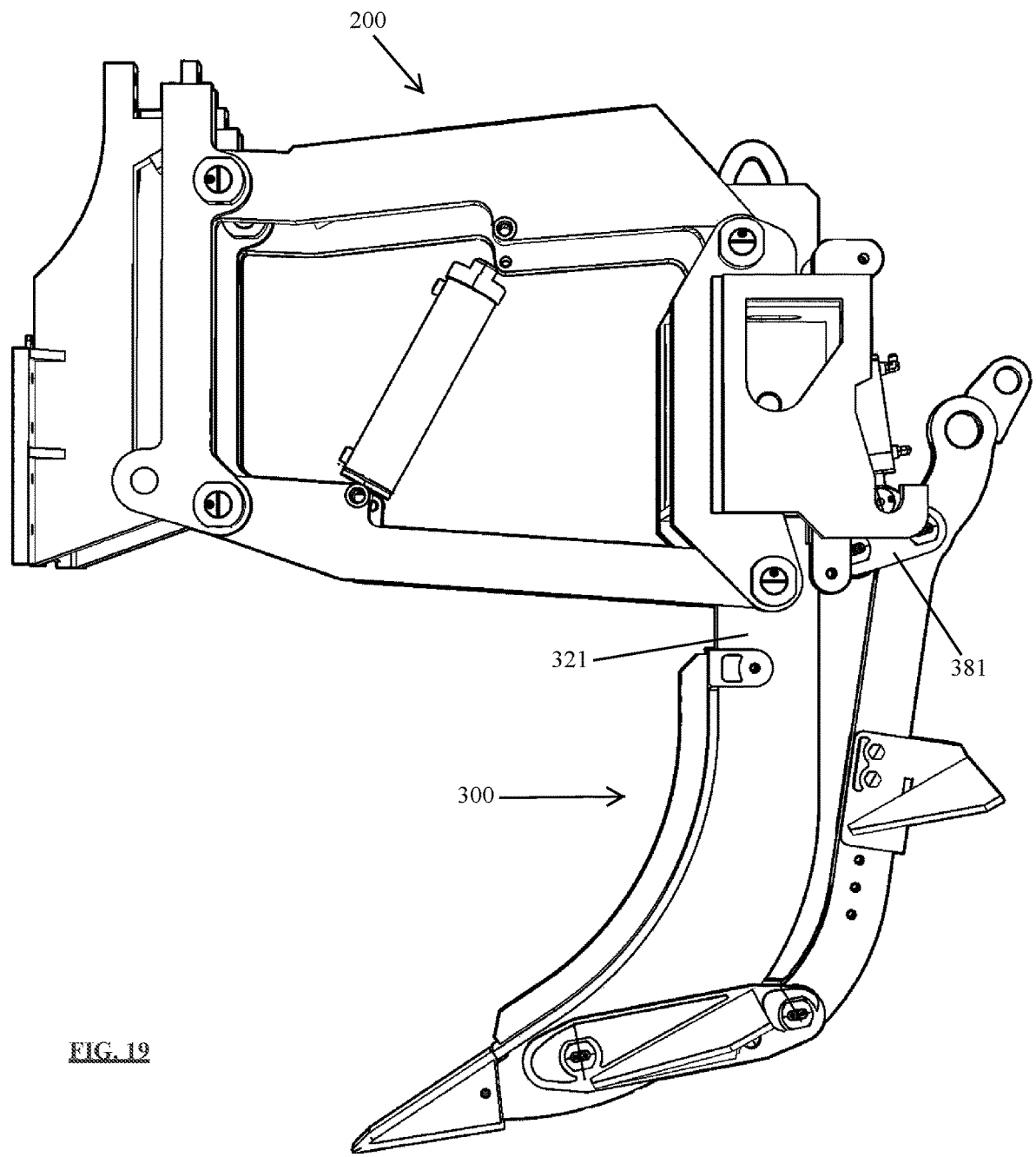
FIG. 19 is a side view diagram of the exemplary ripper assembly illustrated in FIG. 18.
Figure 20:
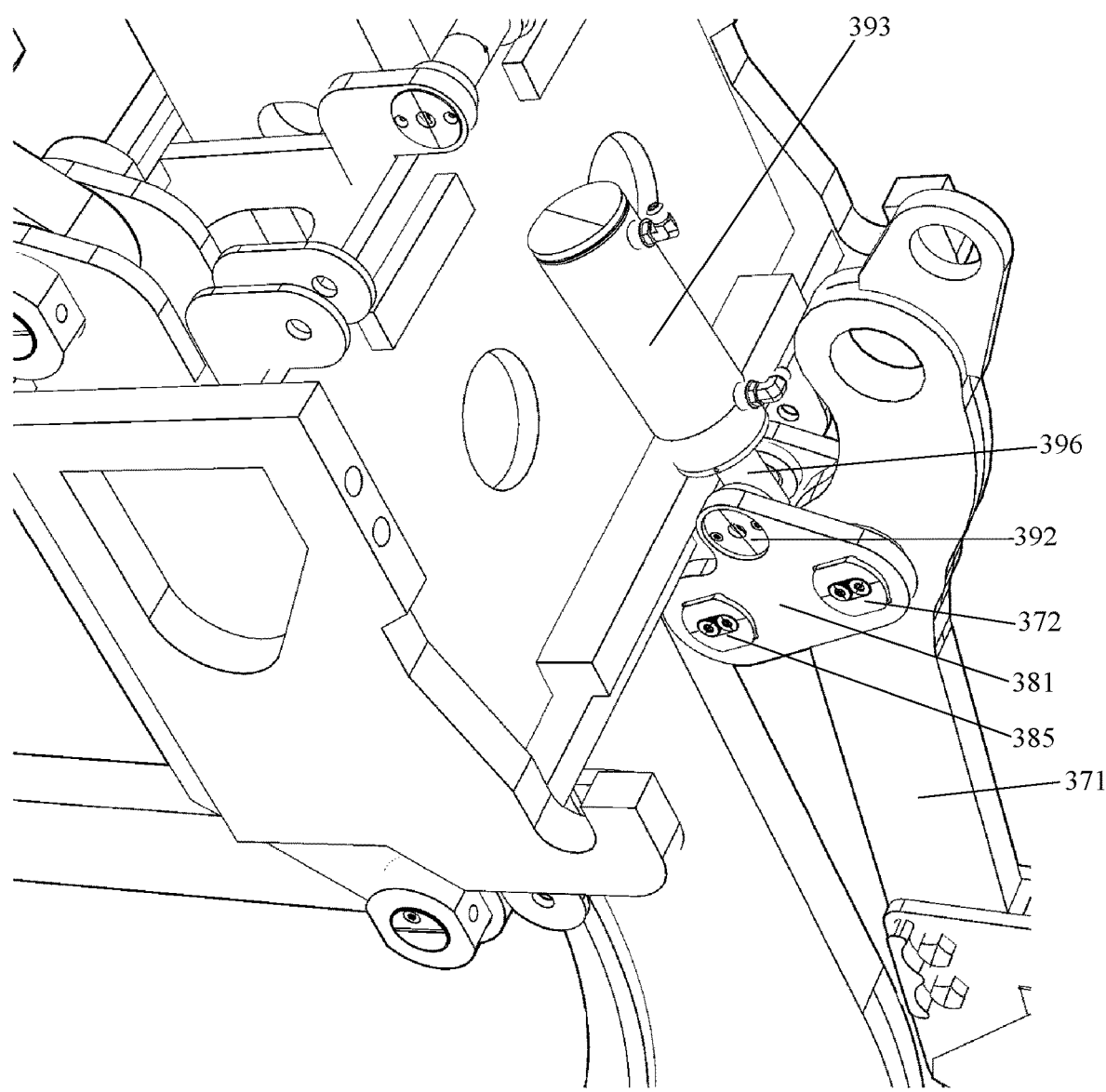
FIG. 20 is a perspective view diagram illustrating an exemplary improved power link portion of the exemplary ripper assembly illustrated in FIG. 18.

As illustrated in FIGS. 18-20, in one embodiment of the present invention, a ripper assembly 300, having a power link 381, may be engaged with the toolbar portion of a tractor mounting assembly 200. Power link 381 may have a generally triangular shape (or exaggerated "boomerang" shape) and, at its apexes, may be pivotally engaged at connecting pin 392, bushing 385, and wing rod pivot 372. Power link 381 may be engaged with cylinder rod 396 of drive cylinder 393 at connecting pin 392 at an upper apex of power link 381. Power link 381 may be engaged with wing rod 371 at wing rod pivot 372 at a distal or rear apex of power link 381. Power link 381 may be engaged to the toolbar of the tractor mounting assembly 200, directly or indirectly, at bushing 385 at a proximal or forward apex of power link 381. For purposes of the discussion of power link 381, "upper apex" is defined as the portion of the triangular power link 381 generally nearest to the top of the toolbar, "proximal apex" or "forward apex" is defined as the portion of the triangular power link 381 generally nearest in the horizontal direction shank 321, and "distal apex" or "rear apex" is defined as the portion of the triangular power link 381 generally furthest in the horizontal direction shank 321.

Figure 21:
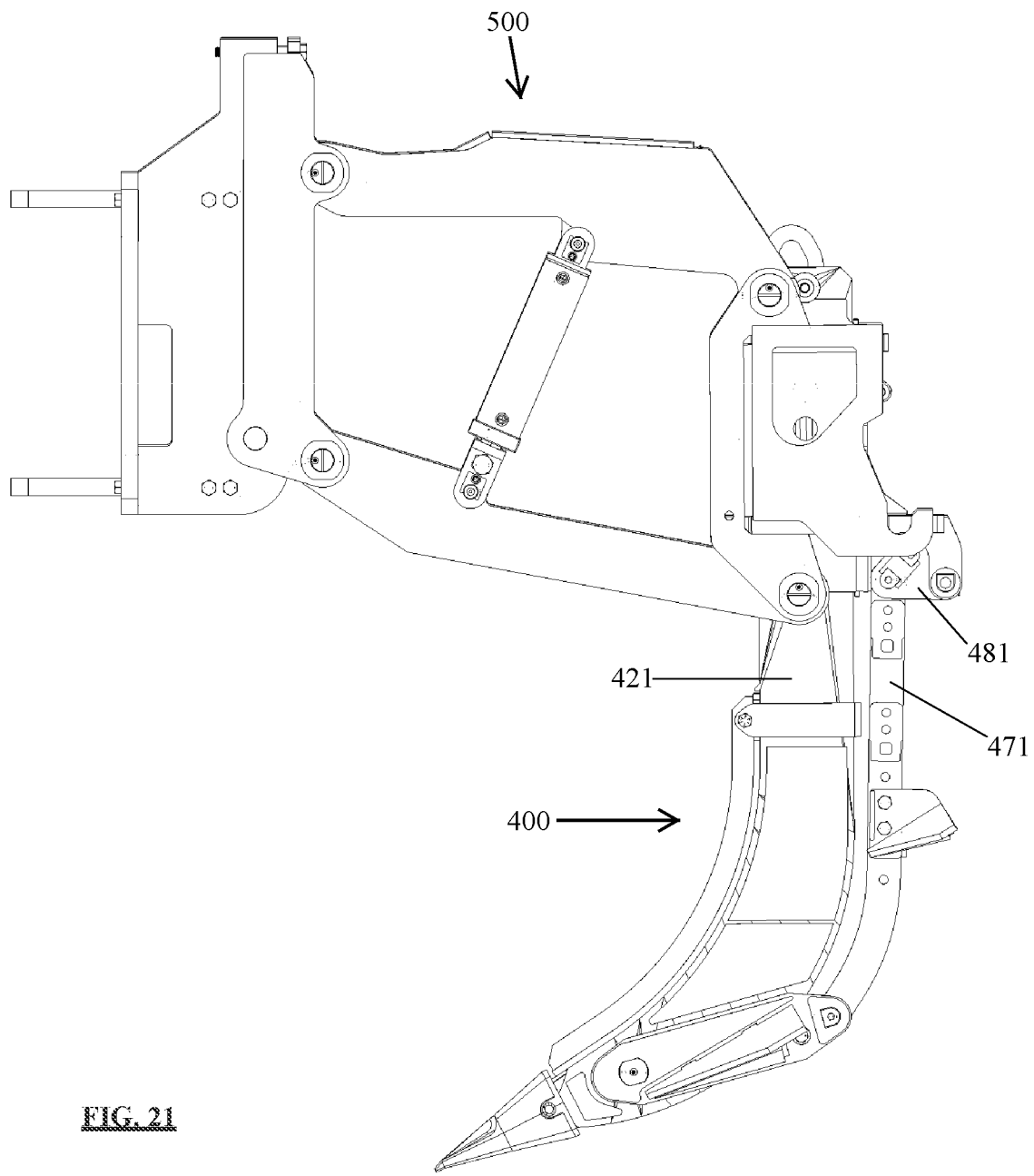
FIG. 21 is a side view diagram illustrating a ripper assembly, in accordance with some embodiments of the present invention, engaged with a toolbar of a mounting assembly.
Figure 22:
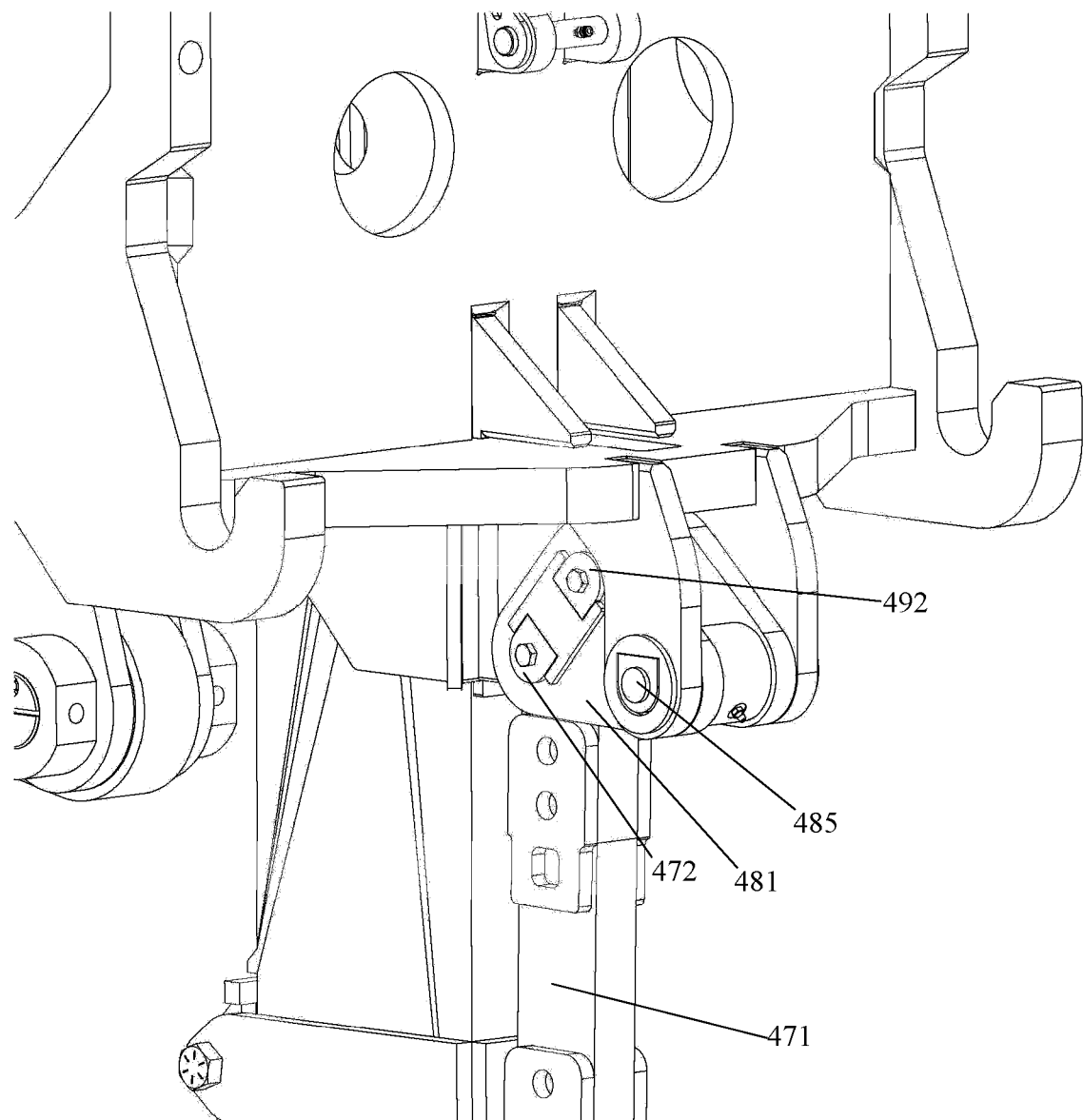
FIG. 22 is a perspective view diagram illustrating an exemplary improved power link portion of the exemplary ripper assembly illustrated in FIG. 21.

Referring to FIGS. 21 and 22, in another embodiment of the present invention, a ripper assembly 400, having a power link 481, may be engaged with the toolbar portion of a tractor mounting assembly 500. Power link 481 may have a generally triangular shape and, at its apexes, may be pivotally engaged at connecting pin 492, bushing 485, and wing rod pivot 472. Power link 481 may be engaged with a cylinder rod of a drive cylinder (not illustrated) at connecting pin 492 at an upper apex of power link 481. Power link 481 may be engaged with wing rod 471 at wing rod pivot 472 at a proximal or forward apex of power link 481. Power link 481 may be engaged to the toolbar of the tractor mounting assembly 500, directly or indirectly, at bushing 485 at a distal or rear apex of power link 481. For purposes of the discussion of power link 481, "upper apex" is defined as the portion of the triangular power link 481 generally nearest to the top of the toolbar, "proximal apex" or "forward apex" is defined as the portion of the triangular power link 481 generally nearest in the horizontal direction shank 421, and "distal apex" or "rear apex" is defined as the portion of the triangular power link 481 generally furthest in the horizontal direction shank 421.

It is to be appreciated that power link 381 or power link 481 may be engaged to a toolbar indirectly (for example and without limitation, by pivotal engagement at bushing 385 or bushing 485, respectively, to a drive box analogous to drive box 90). It is also to be appreciated that, in some embodiments, power link 381 and 481 may have a more defined triangular shape relative to power link 81. Moreover it is to be appreciated that power link 381 and 481 may be pivotal with respect to a drive box or toolbar at a (proximal) forward or (distal) rear apex, respectively, whereas power link 81 may be pivotal with respect to a drive box or toolbar medially.

Figure 5:
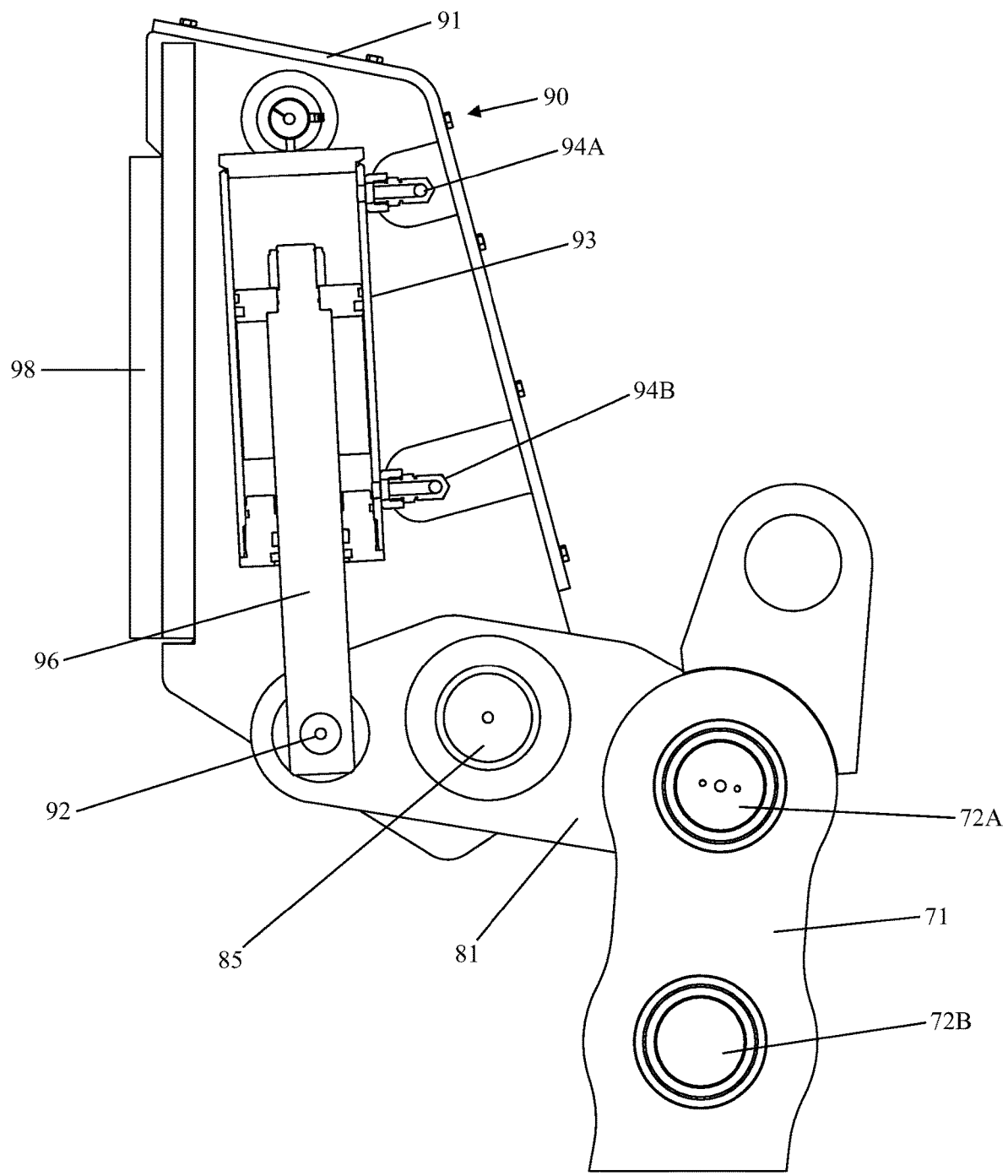
FIG. 5 is a cutaway (or cross-sectional) view diagram illustrating a portion of a driving mechanism in accordance with some embodiments of the present invention.

As illustrated and discussed herein, several configurations of a power link are embodied in the present invention. In one embodiment, and as illustrated in FIGS. 3 and 5, power link 81 may be (i) pivotally engaged to a toolbar, directly, or, indirectly via housing 91 of drive box 90, near a medial portion of power link 81 at bushing 85, (ii) pivotally engaged to cylinder rod 96 of drive box cylinder 93 near a proximal or forward end of power link 81 at connecting pin 92, and (iii) pivotally engaged to wing rod 71 near a distal or rear end of power link 81 at wing rod pivot 72. In another embodiment, and as illustrated in FIG. 20, power link 381 may be (i) pivotally engaged to a toolbar, directly or indirectly, near a proximal or forward apex of power link 381 at bushing 385, (ii) pivotally engaged to cylinder rod 396 of drive box cylinder 393 near an upper apex of power link 381 at connecting pin 392, and (iii) pivotally engaged to wing rod 371 near a distal or rear apex of power link 381 at wing rod pivot 372. In another embodiment, and as illustrated in FIG. 22, power link 481 may be (i) pivotally engaged to a toolbar, directly or indirectly, near a distal or rear apex of power link 481 at bushing 485, (ii) pivotally engaged to a cylinder rod of a drive box cylinder (not shown) near an upper apex of power link 481 at connecting pin 492, and (iii) pivotally engaged to wing rod 471 near a proximal or forward apex of power link 481 at wing rod pivot 472. It is appreciated however that the present invention is not limited to the embodiments illustrated and described above, but rather, other pivotal configurations of a power link are contemplated in accordance with other embodiments of the present invention.

In comparison, and with reference to FIGS. 5, 20, and 22, power link 81 may engage a toolbar at a medial portion, power link 381 may engage a toolbar at a proximal or forward apex, and power link 481 may engage a toolbar at a distal or rear apex. Power link 81 may engage wing rod 71 at a distal or rear end (furthest from shank 21), power link 381 may engage wing rod 371 at a distal or rear apex, and power link 481 may engage wing rod 471 at a proximal or forward apex. Power link 81 may engage a cylinder rod of a drive box cylinder at a proximal or forward end (closest to shank 21), power link 381 may engage a cylinder rod of a drive box cylinder at an upper apex, and power link 481 may engage a cylinder rod of a drive box cylinder an upper apex.

It is to be appreciated that the present invention contemplates a number of wing rod shapes. As illustrated in FIG. 3, wing rod 71 is engaged at a distal end of power link 81 furthest from shank 21, and has a generally straight shape between wing rod pivot 72 and forward wing pivot 62. As illustrated in FIGS. 19 and 20, wing rod 371 is engaged at a rear apex of power link 381, and has a generally "J" shape between wing rod pivot 373 and the pivot at the forward wing link (e.g., curves inwards towards shank 321 near the forward wing link). As illustrated in FIG. 21, wing rod 471 is engaged at a forward apex of power link 481, and has a generally "J" shape approximating the shape of the rear edge of shank 421. In certain embodiments, the wing rod of a ripper assembly may approximate the shape of the rear edge of the shank and engage a rear apex of the power link, such that a top portion of the wing rod curves away from the shank. In this configuration, the wing rod has a generally "S" shape between the engagement point with the power link and the pivot at the forward wing link. It is to be appreciated that wing rod 71, wing rod 371, and wing rod 471 have different shapes and different ranges of movement relative to the shanks (e.g., wing rod 71 and wing rod 371 have greater forward and rearward components of oscillation, than wing rod 471. In addition, it is to be appreciated that a closer spacing between with wing rod and the shank prevents soil from passing through, accumulating between, the shank and the wing rod, thereby reducing drag and preventing wear or damage to the parts.

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention.

What is claimed is:

1. A subsoil tool comprising:
   a) a shank;
   b) a forward wing link comprising a forward wing and pivotally engaged with said shank;
   c) a wing rod comprising a following wing and pivotally engaged with said forward wing link;
   d) a hydraulic drive cylinder having a cylinder rod; and
   e) a power link pivotally engaged with said wing rod and pivotally engaged with said cylinder rod of said drive cylinder.

2. The subsoil tool of claim 1, wherein said power link comprises a generally rectangular shape.

3. The subsoil tool of claim 2, wherein said power link is pivotally engaged at a distal end with said wing rod.

4. The subsoil tool of claim 3, wherein said power link is pivotally engaged at a proximal end with said cylinder rod.

5. The subsoil tool of claim 4, wherein said power link is configured to be pivotally engaged at a medial position with a toolbar of a tractor.

6. The subsoil tool of claim 2, wherein said power link is pivotally engaged at a proximal end with said wing rod.

7. The subsoil tool of claim 6, wherein said power link is pivotally engaged at a distal end with said cylinder rod.

8. The subsoil tool of claim 7, wherein said power link is configured to be pivotally engaged at a medial position with a toolbar of a tractor.

9. The subsoil tool of claim 1, wherein said power link comprises a generally triangular shape.

10. The subsoil tool of claim 9, wherein said power link is pivotally engaged at an upper apex with said cylinder rod.

11. The subsoil tool of claim 10, wherein said power link is pivotally engaged at a distal apex with said wing rod.

12. The subsoil tool of claim 11, wherein said power link is configured to be pivotally engaged at a proximal apex with a toolbar of a tractor.

13. The subsoil tool of claim 10, wherein said power link is pivotally engaged at a proximal apex with said wing rod.

14. The subsoil tool of claim 13, wherein said power link is configured to be pivotally engaged at a distal apex with a toolbar of a tractor.

15. The subsoil tool of claim 9, wherein said power link is pivotally engaged at a proximal apex with said wing rod.

16. The subsoil tool of claim 9, wherein said power link is pivotally engaged at a distal apex with said wing rod.

17. The subsoil tool of claim 1, wherein said power link is generally rectangular, and wherein said power link is pivotally engaged at a proximal end with said cylinder rod and at a distal end with said wing rod, and wherein a shape of said wing rod between said pivotal engagement with said forward wing link and said power link is generally straight.

18. The subsoil tool of claim 1, wherein said power link is generally triangular, and wherein said power link is pivotally engaged at an upper apex with said cylinder rod and at a distal end with said wing rod, and wherein a shape of said wing rod between said pivotal engagement with said forward wing link and said pivotal engagement with said power link is generally "J" shaped.

19. The subsoil tool of claim 18, wherein the distance between said shank and said wing rod increases between said pivotal engagement with said forward wing link and said pivotal engagement with said power link.

20. The subsoil tool of claim 1, wherein said power link is generally triangular, and wherein said power link is pivotally engaged at an upper apex with said cylinder rod and at a proximal end with said wing rod, and wherein a shape of said wing rod between said pivotal engagement with said forward wing link and said pivotal engagement with said power link is generally "J" shaped.

21. The subsoil tool of claim 20, wherein the distance between said shank and said wing rod is about the same between said pivotal engagement with said forward wing link and said pivotal engagement with said power link.

22. The subsoil tool of claim 1, wherein said power link is configured to be pivotally engaged with a toolbar of a tractor.

23. A system for ameliorating soil compaction, comprising:
a) a tractor comprising a toolbar; and
b) a subsoil tool, said subsoil tool comprising:
i) a shank engaged with said toolbar of said tractor;
ii) a forward wing link comprising a forward wing and engaged with said shank;
iii) a wing rod comprising a following wing, said wing rod engaged with said forward wing link;
iv) a hydraulic drive cylinder engaged with said toolbar of said tractor; and
v) a generally rectangular power link engaged with said wing rod, said toolbar of said tractor, and a cylinder rod of said drive cylinder.

24. The system of claim 23, wherein said power link is pivotally engaged at a proximal end with said toolbar of said tractor.

25. The system of claim 23, wherein said power link is pivotally engaged at a medial position with said toolbar of said tractor.

26. The system of claim 23, wherein said power link is pivotally engaged at a distal end with said toolbar of said tractor.

27. A system for ameliorating soil compaction, comprising:
a) a tractor comprising a toolbar; and
b) a subsoil tool, said subsoil tool comprising:
i) a shank engaged with said toolbar of said tractor;
ii) a forward wing link comprising a forward wing and engaged with said shank;
iii) a wing rod comprising a following wing, said wing rod engaged with said forward wing link;
iv) a hydraulic drive cylinder engaged with said toolbar of said tractor; and
v) a generally triangular power link engaged with said wing rod, said toolbar of said tractor, and a cylinder rod of said drive cylinder.

28. The system of claim 27, wherein said power link is pivotally engaged at a proximal apex with said toolbar of said tractor.

29. The system of claim 27, wherein said power link is pivotally engaged at a distal apex with said toolbar of said tractor.

30. The system of claim 27, wherein said power link is pivotally engaged at an upper apex with said toolbar of said tractor.

* * * * *